United States Patent [19]

Fromm

[11] Patent Number: 5,696,922
[45] Date of Patent: Dec. 9, 1997

[54] RECURSIVE ADDRESS CENTRIFUGE FOR DISTRIBUTED MEMORY MASSIVELY PARALLEL PROCESSING SYSTEMS

[75] Inventor: Eric C. Fromm, Eau Claire, Wis.

[73] Assignee: Cray Research, Inc., Eagan, Minn.

[21] Appl. No.: 165,388

[22] Filed: Dec. 10, 1993

[51] Int. Cl.$^6$ ................................................ G06F 12/00
[52] U.S. Cl. ................................ 395/405; 395/421.1
[58] Field of Search .................................. 395/200, 400, 395/425, 427, 405, 421.1, 401; 282/283

[56] References Cited

FOREIGN PATENT DOCUMENTS

| 0570729 | 11/1993 | European Pat. Off. |
| WO91/10194 | 7/1991 | WIPO |
| WO91/10200 | 7/1991 | WIPO |

OTHER PUBLICATIONS

Tom MacDonald, et al. "Addressing in Cray Research's MPP Fortran," *Proceedings, Third Workshop on Compilers for Parallel Computers*, ACPC/TR, Jul., 1992.

Erik P. DeBenedictis, et al. "Extending Unix for Scalable Computing," *Computer*, vol. 26, No. 11, pp. 43–53, Nov., 1993.

David Loveman, "Element Array Assignment —the FORALL Statement," *Proceedings, Third Workshop on Compilers for Parallel Computers*, ACPC/TR, Jul., 1992.

Min-You Wu, et al., "DO and FORALL: Temporal and Spacial Control Structures," *Proceedings, Third Workshop on Compilers for Parallel Computers*, ACPC/TR, Jul., 1992.

Philip J. Hatcher, et al., "Compiling Data–Parallel Programs for MIMD Architectures," *Proceedings, Third Workshop on Compilers for Parallel Computers*, ACPC/TR, Jul., 1992.

Barbara Chapman, et al., "Programming in Vienna Fortran," *Proceedings, Third Workshop on Compilers for Parallel Computers*, ACPC/TR, Jul., 1992.

*Primary Examiner*—Jack A. Lane
*Attorney, Agent, or Firm*—Schwegman, Lundberg, Woessner & Kluth, P.A.

[57] ABSTRACT

A method for extracting a PE number and offset from an array index by recursive centrifuging. According to one aspect of the present invention, a processing element number is assigned to each processing element, a local memory address is assigned to each memory location and a linearized index is assigned to each array element in a multidimensional array. The processing element number of the processing element in which a particular array element is stored is computed as a function of a linearized index associated with the array element and a mask word determined from the distribution specification associated with the array. The mask word is generated from the distribution specification and applied to a linearized index associated with a particular array element to obtain processing element number bits and local offset bits. The processing element number bits and local offset bits are then accumulated to create the processing element number and local offset for the memory location associated with the array element.

6 Claims, 20 Drawing Sheets

| DISTRIBUTION ACROSS 4 PEs | | | | | | | | | | | | |
|---|---|---|---|---|---|---|---|---|---|---|---|---|
| PE0 | | | PE1 | | | | PE2 | | | | PE3 | | |
| 1 | 5 | 9 | 13 | 2 | 6 | 10 | · | 3 | 7 | 11 | · | 4 | 8 | 12 | · |

FIG. 3A

| DISTRIBUTION ACROSS 4 PEs | | | | | | | | | | | | |
|---|---|---|---|---|---|---|---|---|---|---|---|---|
| PE0 | | | | PE1 | | | | PE2 | | | | PE3 | | |
| 1 | 2 | 9 | 10 | 3 | 4 | 11 | 12 | 5 | 6 | 13 | · | 7 | 8 | · | · |

FIG. 3B

| DISTRIBUTION ACROSS 4 PEs | | | | | | | | | | | | |
|---|---|---|---|---|---|---|---|---|---|---|---|---|
| PE0 | | | | PE1 | | | | PE2 | | | | PE3 | | |
| 1 | 2 | 3 | 4 | 5 | 6 | 7 | 8 | 9 | 10 | 11 | 12 | 13 | · | · | · |

FIG. 3C

| DISTRIBUTION ACROSS 4 PEs | | | | | | | | | | | | |
|---|---|---|---|---|---|---|---|---|---|---|---|---|
| PE0 | | | | PE1 | | | | PE2 | | | | PE3 | | |
| 1,1 | 1,2 | 1,3 | 1,4 | 1,5 | 1,6 | 1,7 | 1,8 | 1,9 | 1,10 | 1,11 | 1,12 | 1,13 | · | · | · |
| 2,1 | 2,2 | 2,3 | 2,4 | 2,5 | 2,6 | 2,7 | 2,8 | 2,9 | 2,10 | 2,11 | 2,12 | 2,13 | · | · | · |

FIG. 3D

|   | 1 | 2 | 3 | 4 | 5 | 6 | 7 | 8 |
|---|---|---|---|---|---|---|---|---|
| 1 2 | PE0 || PE4 || PE8 || PE12 ||
| 3 4 | PE1 || PE5 || PE9 || PE13 ||
| 5 6 | PE2 || PE6 || PE10 || PE14 ||
| 7 8 | PE3 || PE7 || PE11 || PE15 ||

FIG. 3E

RECURSIVE ADDRESS CENTRIFUGE FOR DISTRIBUTED MEMORY MASSIVELY PARALLEL PROCESSING SYSTEMS

FIELD OF THE INVENTION

The present invention relates generally to massively parallel processing systems, and more particularly to a system and method of extracting a processing element number and local memory address from a global address within a massively parallel processing system.

BACKGROUND OF THE INVENTION

Massively parallel processing involves the utilization of hundreds or thousands of processing elements (PEs) linked together by high speed interconnect networks. Typically, each PE includes a processor, local memory and an interface circuit connecting the PE to the interconnect network. A distributed memory massively parallel processing (MPP) system is one wherein each processor has a favored low latency, high bandwidth path to one or more local memory banks, and a longer latency, lower bandwidth access over the interconnect network to memory banks associated with other processing elements (remote or global memory). In globally addressed distributed memory systems, all memory is directly addressable by any processor in the system. Since data residing in a processor's local memory can be accessed by that processor much faster than can data residing in the memory local to another processor, an incentive is therefore created for a placement of data which enhances locality. Typically, however, data distribution is limited within such MPP systems to a particular stride or to the placement of contiguous blocks of data. There is therefore a need in the art for a flexible addressing scheme which enhances locality for a variety of different processing tasks by efficiently and flexibly distributing data among a group of PEs.

The need to efficiently move blocks of data between local and global memory becomes even more apparent when attempting to optimize performance through the use of cache memory. Spatial coherence, the tendency for successive references to access data in adjacent memory locations, plays a major role in determining cache performance. Poor spatial coherency may exist if the access sequence to a given data structure is accomplished via a large stride (e.g., when accessing a two dimensional Fortran array by rows) or in a random or sparse fashion (e.g., indirect accesses, irregular grids). To achieve good performance, data often must be rearranged from a multitude of different large stride or sparse organizations to a unit stride organization. Furthermore, such a reorganization may require the shifting of data between remote and local memory.

Therefore, in addition to a flexible addressing approach to distributed data in an MPP system, there is a need for an efficient memory mapping of the global address to a local memory address within a PE. In particular, there is a need in the art for a mechanism which supports the above flexible addressing scheme and yet, at the same time, facilitates the reading and storing of data between local and global memory blocks in a massively parallel distributed memory processing system. The support mechanism should allow scatter-gather capabilities in addition to constant strides to facilitate reorganization of sparse or randomly organized data. The mechanism should also be easily directed by the user for adaptation to different types of processing tasks.

SUMMARY OF THE INVENTION

To overcome limitations in the art described above and to overcome other limitations that will become apparent upon reading and understanding the present specification, the present invention provides a method for extracting a PE number and offset from an array index by recursive centrifuging. A processing element number is assigned to each processing element, a local memory address is assigned to each memory location and a linearized index is assigned to each array element in a multidimensional array. The processing element number of the processing element in which a particular array element is stored is computed as a function of a linearized index associated with the array element and a mask word determined from the distribution specification associated with the array. The mask word is generated from the distribution specification and applied in a recursive manner to a linearized index associated with a particular array element to obtain processing element number bits and local offset bits. The processing element number bits and local offset bits are then accumulated to create the processing element number and local offset for the memory location associated with the array element.

BRIEF DESCRIPTION OF THE DRAWINGS

The foregoing and other objects, features and advantages of the invention, as well as the presently preferred embodiments thereof, will become apparent upon reading and understanding the following detailed description and accompanying drawings in which:

FIGS. 3A–E are examples of array element distributions for given data distribution selections;

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes made without departing from the scope of the present invention.

Figure 1:
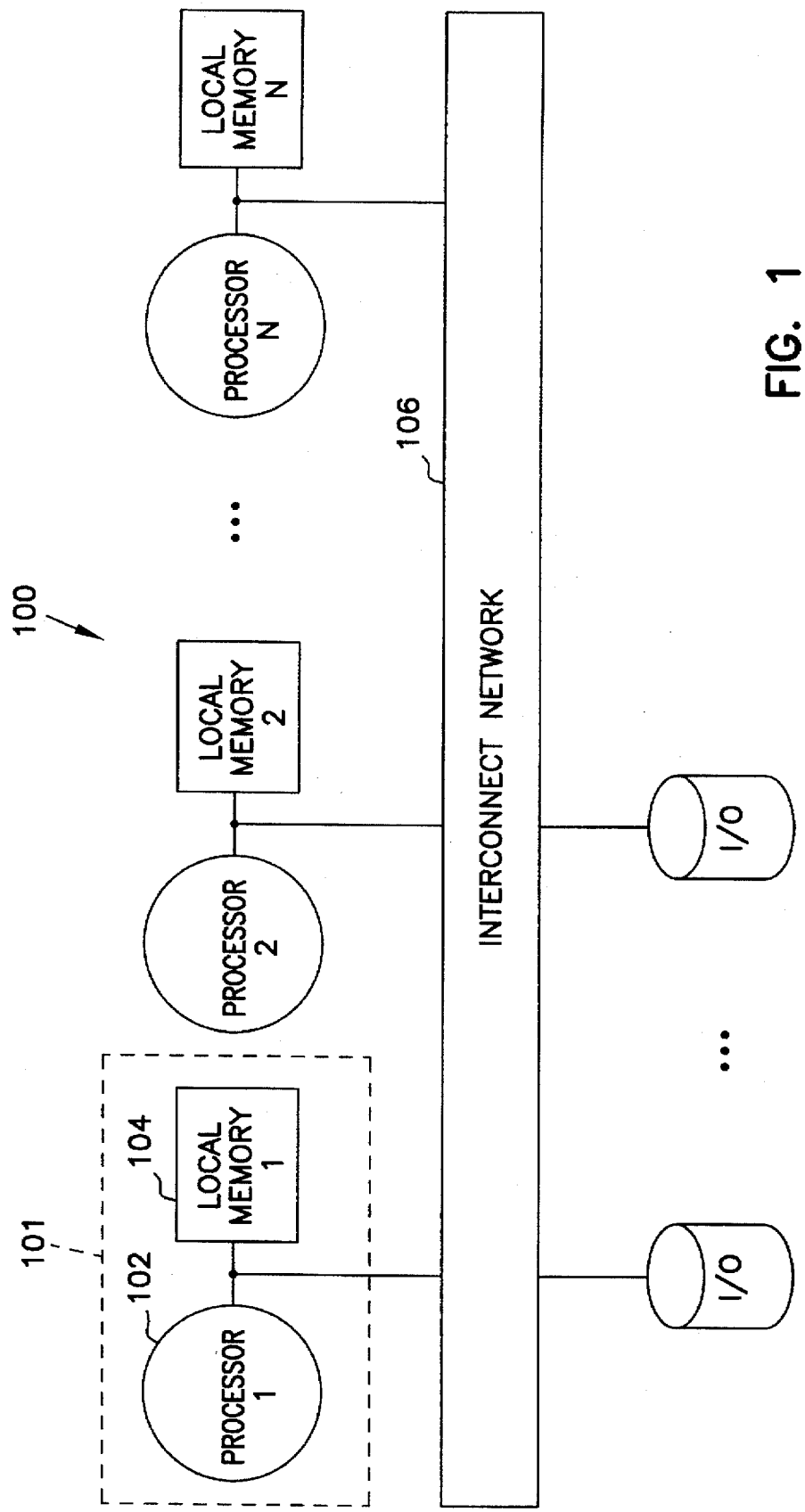
FIG. 1 shows a simplified block diagram of a representative MPP system with which the present centrifuge operation can be used.

The preferred MPP system is a MIMD massively parallel processing system with a physically distributed, globally addressable memory. A representative massively parallel processor (MPP) system 100 is shown in FIG. 1. The MPP system 100 contains hundreds or thousands of processing elements 101, wherein each processing element 101 comprise a processor 102, connected to a local memory 104 and associated support circuitry (not shown). The PE's in the MPP system 100 are linked via an interconnect network 106.

The preferred MPP system 100 has a physically distributed globally addressed memory, wherein each processor 102 has a favored, low latency, high bandwidth path to a local memory 104, and a longer latency lower bandwidth access to the memory banks 104 associated with other processors 102 over the interconnect network 106. In the preferred embodiment, the interconnect network 106 is comprised of a 3-dimensional torus which, when connected, creates a 3-dimensional matrix of PEs. The torus design has several advantages, including high speed information transfers and the ability to avoid bad communication links. A toroidal interconnect network is also scalable in all three dimensions. An interconnect network of this nature is described in more detail in the copending and commonly assigned U.S. patent application Ser. No. 07/983,979, entitled "DIRECTION ORDER ROUTING IN MULTI-PROCESSING SYSTEMS", by Gregory M. Thorsen, filed Nov. 30, 1992, which is incorporated herein by reference.

Figure 2:
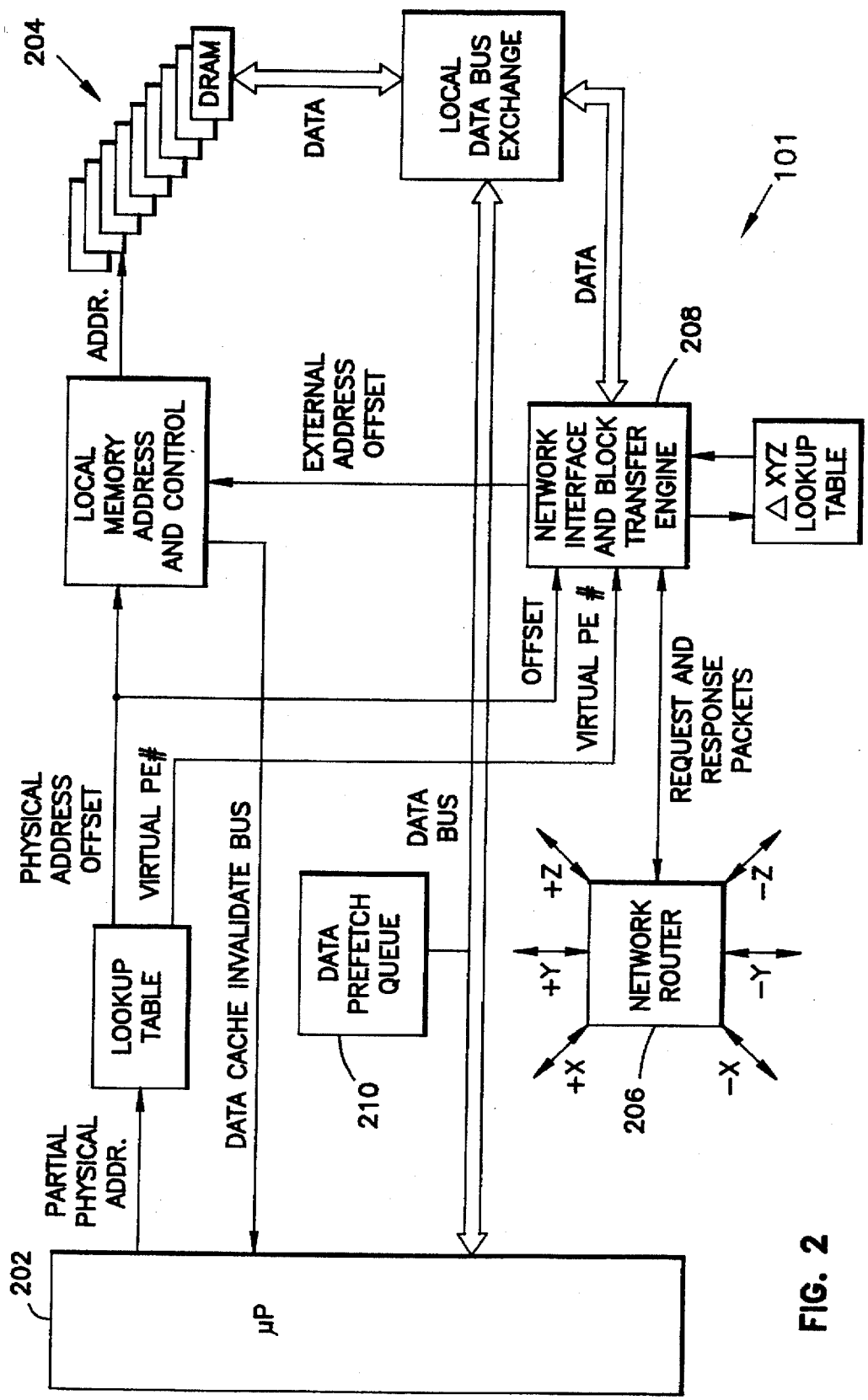
FIG. 2 shows a block diagram of a processing element (PE), including a processor, its associated shell circuitry, and local memory.

FIG. 2 shows a simplified block diagram of one embodiment of a PE 101. In such an embodiment, an individual PE 101 includes a high-performance RISC (reduced instruction set computer) microprocessor 202. In the preferred MPP system, microprocessor 202 is the DECChip 21064-AA RISC microprocessor, available from Digital Equipment Corporation. Each microprocessor 202 is coupled to a local memory 204 that is a distributed portion of the globally-addressable system memory. Each PE 101 further includes a shell of circuitry that implements synchronization and communication functions facilitating interactions between processors.

The shell circuitry includes an interconnection network router 206, used to connect multiple PEs 101 in a three-dimensional toroidal "fabric". The toroidal interconnect network carries all data communicated between PEs and memories that are not local. In the embodiment shown, an optional block transfer engine 208 in the PE shell circuitry permits asynchronous (i.e., independent of the local processor) movement of data, such as block transfers, between the local memory 204 and remote memories associated with other PEs 101, while providing flexible addressing modes that permit a high degree of control over the redistribution of data between the shared portions of the system memory. In one such embodiment, a separate hardware-implemented address centrifuge is associated with the block transfer engine 208. However, it shall be understood that the centrifuge operation can be used to generate global addresses with or without special hardware support. The implementation of the centrifuge within the block transfer engine is for purposes of illustration only, and is not a limitation of the present invention.

The shell circuitry also includes a data prefetch queue 210 which allows microprocessor 202 to directly initiate data movement between remote memories and the local processor in a way that can hide access latency and permit multiple remote memory references to be outstanding.

Synchronization circuits in the shell permit synchronization at various different levels of program or data granularity in order to best match the synchronization method that is "natural" for a given parallelization technique. At the finest granularity, data-level synchronization is facilitated by an atomic swap mechanism that permits the locking of data on an element-by-element basis. The atomic swap operation is described in detail in the copending and commonly assigned U.S. patent application entitled "ATOMIC UPDATE OF MEMORY," METHOD AND APPARATUS FOR LOCKING SHAPED MEMORY LOCATIONS IN MULTIPROCESSING SYSTEM, issued as U.S. Pat. No. 5,535,365 on Jul. 9, 1996 filed on Oct. 22, 1993, by Barriuso et al., which detail is incorporated herein by reference. A more coarse grain data-level synchronization primitive is provided by a messaging facility, which permits a PE to send a packet of data to another PE and cause an interrupt upon message arrival, providing for the management of message queues and low-level messaging protocol in hardware. Control-level synchronization at the program loop level is provided by a large set of globally accessible fetch-and-increment registers that can be used to dynamically distribute work (in the form of iterations of a loop, for instance) among processors at run time. Yet another form of control-level synchronization, barrier synchronization, is useful to control transitions between major program blocks (i.e., between loops performing actions on the same data sets). The barrier mechanism is described in detail in the copending and commonly assigned U.S. patent application entitled "BARRIER SYNCHRONIZATION FOR DISTRIBUTED MEMORY MASSIVELY PARALLEL PROCESSING SYSTEMS," issued as U.S. Pat. No. 5,434,995, issued Jul. 18, 1996, by Oberlin et al., which is incorporated herein by reference.

Data Distribution

An important concept in a distributed memory MPP system such as the one described herein is the fact that different processing tasks may profit from very different data distributions for most efficient processing performance. The present invention provides a system and method which allows the programmer to easily designate the optimal distribution of data in memory for a particular processing task.

The global address model permits data objects, such as scalars or arrays, distributed across all of the PEs, to be viewed as if there were a single address space. In one embodiment, data distribution is defined through a set of directives that indicate how a data object is distributed. Directives are used to aid portability and allow for migration to future standards for parallel execution. The directives are defined to allow dimensions of a shared array to be distributed in different manners. In one such embodiment, the declaration of a dimensionally distributed array is used to specify the distribution of array elements within each dimension and each dimension is distributed as if it were independent from all other dimensions. A programmer, therefore, has great flexibility in distributing data to increase the locality of data references.

In one such embodiment, distribution within each dimension is controlled by the distribution specifiers :BLOCK(N), :BLOCK and :. The distribution specifier :BLOCK(N) specifies a distribution in which N contiguous array elements are placed within a block, and the blocks are distributed among the assigned PEs. N is therefore the block size, or number of array elements in each block, of the distribution. In such a distribution, each PE owns the same number of blocks.

The distribution specifier :BLOCK specifies a block distribution where each PE owns exactly one block of contiguous elements. The distribution specifier: specifies a degenerate distribution in that dimension. That is, an entire dimension is distributed so that it is resident on a single PE.

FIG. 3A illustrates the :BLOCK(N) distribution of a thirteen element single-dimension array distributed across 4 PEs. In this example, block-size N is equal to one. Such a distribution may be requested using the following lines of parallel Fortran code:

```
            REAL A (13)
CRIR$       SHARED A ( :BLOCK(2) )
```

This kind of distribution is often referred to as a cyclic distribution because the elements of array A cycle individually through the PEs. That is, the elements of A are distributed so that contiguous elements are on adjacent PEs. It should be noted that space is left for unassigned array elements 14 through 16. In the preferred embodiment, unassigned elements are allocated automatically in order to round the extent of each array dimension to a power of two. This restriction on the extent of array dimensions and the methods used to ensure such are detailed in the copending and commonly assigned U.S. patent application entitled "DYNAMIC ALLOCATION OF ARRAY SIZES, assigned U.S. Ser. No. 08/165,379, filed on Dec. 10, 1993" by MacDonald et al., filed herewith, which detail is incorporated herein by reference.

FIG. 3B illustrates the same array A but with a block-size N equal to two. Such distribution could be requested using the following parallel Fortran statements:

```
            REAL A(13)
CRIR$       SHARED A( :BLOCK(2) )
```

This distribution places two contiguous elements in each block. As can be seen by comparing FIGS. 3A and 3B, such a distribution places a majority of the elements of A on different PEs than in the :BLOCK(1) distribution of FIG. 3A. Also, the unassigned elements are placed on different PEs.

FIG. 3C illustrates the default data distribution when a value of N is not specified. Such a distribution could be requested using the following parallel Fortran statements:

```
            REAL A(13)
CDIR$       SHARED A( :BLOCK )
```

The block size for the :BLOCK distribution is such that a single contiguous block is assigned to each PE. That is, N is set to the extent of the dimension (rounded up to a power of two) divided by the number of PEs assigned to that dimension. Typically, the number of PEs assigned to a dimension is restricted to a power of 2 in order to make such calculations easier.

As stated above, each dimension of a multidimensional array can be distributed separately. FIG. 3E illustrates a two-dimensional array where both dimensions are distributed separately. Such a distribution could be requested using the following parallel Fortran statements:

```
            REAL D(8,8)
CDIR$       SHARED D(:BLOCK, :BLOCK)
```

In the example shown in FIG. 3E, array D is distributed across 16 PEs. When both dimensions of a two-dimensional array are distributed, the number of PEs is factored such that each dimension i is assigned a number of PEs, P[i]. In one embodiment, P[i] is restricted to being a power of two. As can be seen, each dimension has its own block size (B[i]). Since both dimensions of array D are distributed with the BLOCK distribution, the block size is computed as follows:

$$B[1]=E[1]/P[1]$$

$$B[2]=E[2]/P[2]$$

where E[i] is the extent of dimension i and P[i] is the number of PEs assigned to that dimension.

As stated above, each dimension of a multidimensional array can be distributed in a different manner. FIG. 3D illustrates a degenerate distribution in one dimension of a two-dimensional array and a default distribution in the second dimension. Such a two-dimensional array can be created and distributed in the following manner:

```
            REAL A(2,13)
CDIR$       SHARED A(:,:BLOCK)
```

The degenerate distribution allows an entire dimension to be assigned to one PE. This is useful when, for example, locality can be enhanced by placing an entire row or column of an array on a single PE. FIG. 3D illustrates the situation where a column from a two-dimensional array is assigned to each PE through a degenerate distribution.

Global Address Computation

To find the location within the toroidal mesh of an element of an array, one must determine the number of the PE to which that element has been assigned and the address within the local memory of that PE. The PE number and the local address together, therefore, describe a particular location in global memory. In the preferred embodiment, a PE number and local offset are encoded in the linearized index of the element. The local offset is combined with the local base address to form the local address of the element. The index must therefore be separated into its component parts, viz., PE number and local offset, and combined with the local base address within the PE prior to application to the torus network.

The present invention describes a method which simplifies the calculation of the global address, and includes the extraction of PE number and local offset from a linearized array index and distribution specification. In addition, the present invention describes a mechanism for accomplishing this calculation in software or in hardware while providing a high degree of flexibility as to which bits of the index are designated PE number bits and which are local offset bits. In one embodiment, a software program extracts the PE number and local offset from a linearized index in a manner to be described. In another embodiment, a centrifuge extracts PE number bits from the index under control of a software supplied mask and compresses out the "holes" left in the offset by their removal. In one series of embodiments, this masking and compression are done in hardware in a manner to be described.

Shared Data Descriptors

As can be seen in FIGS. 3A–C, the 7th element of array A, A(7), could be distributed on any one of the PEs depending on the data distribution selected. Therefore, in order to find element A(7), it is necessary to know not only that it is the 7th element within array A, but also the data distribution algorithm used to distribute the elements of A across the assigned PEs. In one embodiment, the data distribution algorithm is determined by examining the extent E[i] of each dimension of the array, the number of PEs P[i]allocated to that dimension and the block size B[i] chosen in the distribution specifier statement for each dimension. This information would require M bits of information for each dimension i, where:

$$M[i]=\log2(E[i])+\log2(P[i])+\log2(B[i])$$

Such an approach overspecifies the information needed. For instance if dimension x has an extent $E[x]=32$ and $P[x]=2$ and $B[x]=4$, a total of eight bits would be needed to specify the location of an element within the data object. Therefore, in another embodiment, the value E[i] is replaced with a value C[i], where C[i] is the number of cycles through the PEs. Now, $$C[i]=E[i]/(P[i]*B[i])$$

and the number of bits M'[i] needed to locate an element within a dimension is:

$$\begin{aligned} M'[i] &= \log2(C[i]) + \log2(P[i]) + \log2(B[i]) \\ &= (\log2(E[i]) - (\log2(P[i]) + \log2(B[i]))) + \\ &\quad \log2(P[i]) + \log2(B[i]) \\ &= \log2(E[i]) \end{aligned}$$

or five bits in the above example. As can be seen, the number of bits required to represent the cycle, PE and block size is equal to the number of bits required to identify an element within array A. Therefore, for each dimension, one can specify the location of an element within that dimension by specifying the three different fields: cycle, PE, and block. What is unique about this approach is that it embeds the information leading to a PE's identity within each dimension. It is then possible to extract PE identification information out of each dimension and combine the information to determine the system PE number.

As is detailed in the copending and commonly assigned U.S. patent application entitled "DYNAMIC ALLOCATION OF ARRAY SIZES," assigned U.S. Ser. No, 08/165, 379, filed on Dec. 10, 1993 by MacDonald et al. and hereby incorporated by reference, in the preferred embodiment of MPP system 100, the extent of each array dimension is rounded up to a power of two. Therefore, each bit position in a linearized array index corresponds to a well defined bit position in the PE number and offset of the associated reference. Applying what was found above, each dimension of a shared array has three associated sections in its distribution specification: block-size (B), PE (P) and cycle (C). The P section occupies bit positions which contribute to the object's PE number while the B and C fields contribute to the object's address within the PE. In one embodiment, as is described in the copending and commonly assigned U.S. patent application entitled "SHARED/PRIVATE MEMORY SEGMENTS" METHOD OF MANAGING DISTRIBUTED MEMORY WITHIN A MASSIVELY PARALLEL PROCESSING SYSTEM, issued as U.S. Pat. No. 5,566,321 on Oct. 15, 1996 by Wagner et al. and hereby incorporated by reference, a PE's local memory is split into a number of segments, with some segments marked as private and others as shared memory. The offset in such an embodiment would be combined with the array local base address to form the local virtual address (LVA) within a shared segment.

Figure 5:
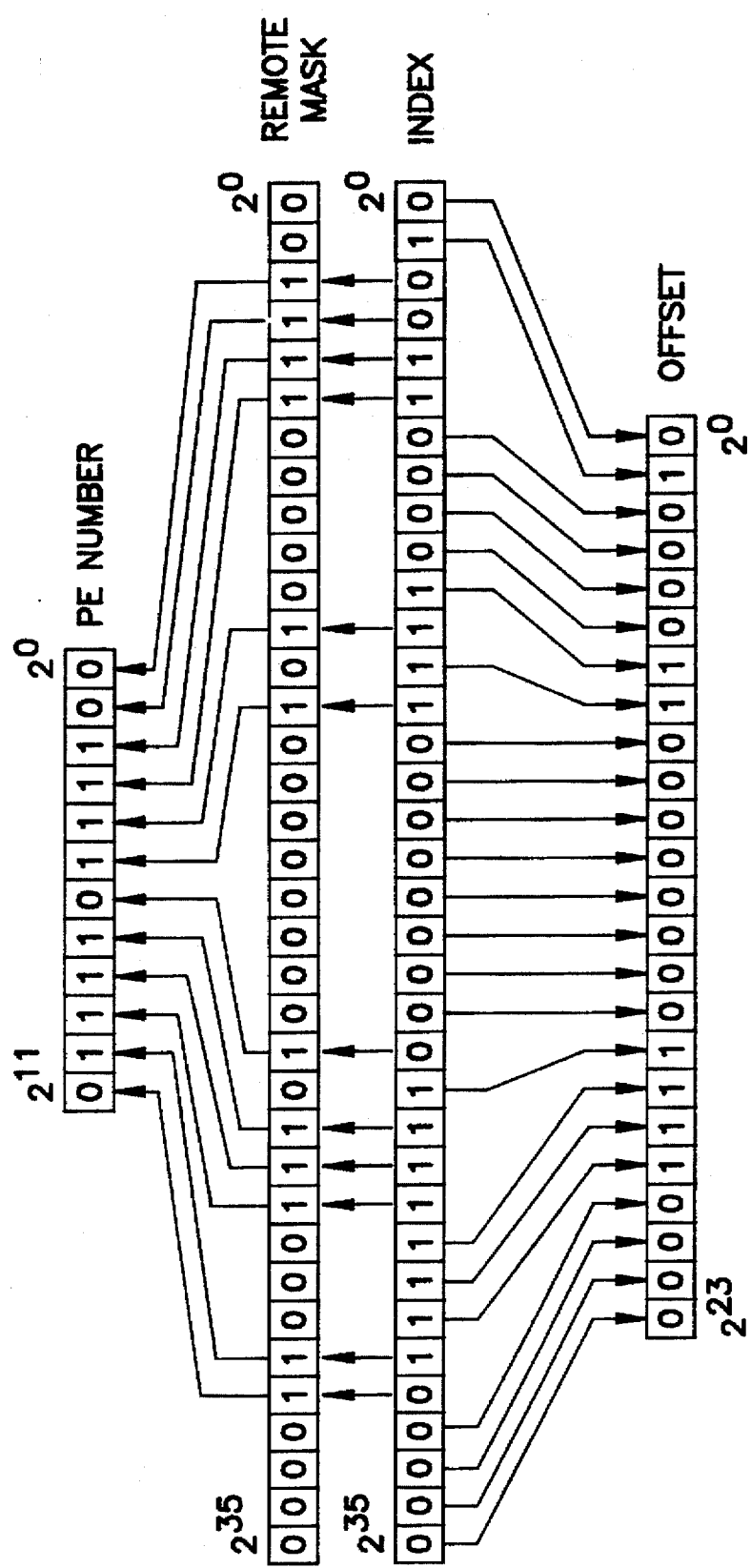
FIG. 5 illustrates the separation of the linearized index into a PE number and local offset.
Figure 6:
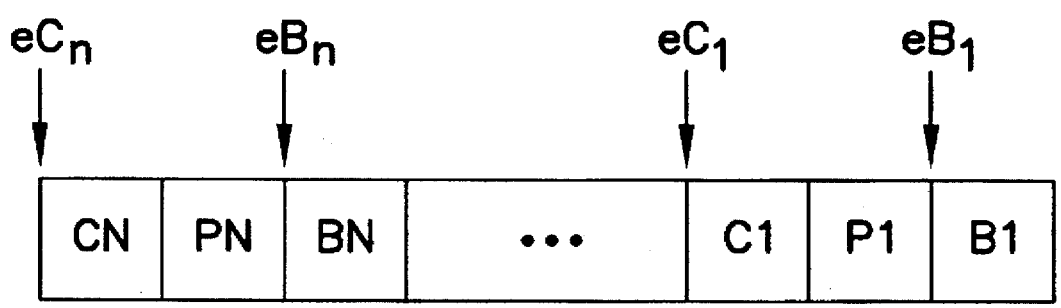
FIG. 6 shows the fields in a centrifuge mask for an N-dimensional array.

In one embodiment, as in FIG. 5 above, the distribution specification can be represented as a distribution mask 620. In the preferred embodiment of this method, PE bits in the mask are designated by a "1" while cycle and block-size bits are "0"s. Such a mask is typically split into N dimensions as in FIG. 6, with the number of bits reserved for each dimension equal to the base two log of the extent of that dimension. The three fields of each dimension are concatenated to form the address mask. For example, a representative mask for an N-dimensional array would be formed by concatenating C[7], P[7], B[7], . . . , C[1], P[1], B[1]. Such a mask is shown in FIG. 6. In a mask such as in FIG. 6, $eB_j$ is defined as the end bit position for the block-size bits of dimension j and $eC_j$ is the end bit positions for the cycle bits of dimension j. The suffix indicates array dimension, with 1 indicating the fastest running dimension. In the MPP parallel Fortran embodiment, a maximum of seven dimensions is permitted. Shared scalars are treated as a special case of 1 dimensional arrays.

In one embodiment, distribution mask 620 bit positions are numbered from the least significant bit (LSB) 0 on the right to the most significant bit (MSB) on the left. The width w of a field within the mask is the number of bit positions it occupies, while the bit position one beyond the end of a field is called the "end bit position" of the section. For example: if B[1], P[1], C[1] occupy 4, 3, and 5 bits respectively, their end bit positions are 4, 7, and 12, respectively.

The block bits B[i] of a dimension i determine an element offset within a block. PE-number bits, tagged P, determine part of the PE address of an element, while cycle (C) bits determine the occurrence (cycle) of a block. As shown in FIG. 6, $eB_j$ ($eC_j$) indicate the bit position one beyond the Block (Cycle) section for dimension j. $wP_j$ gives the bit width of the PE-number for dimension j. The eB and wP attributes provide enough information to reconstruct an array's centrifuge mask. By supplying the eC attributes, however, the PE and offset contributions of each dimension can be computed independently, thus supporting dimensional separation.

Data distribution of a multidimensional array A can be described within the following expression:

$$\text{DIMENSION } A(L_1{:}U_1, \ldots, L_d{:}U_d)$$
$$\text{CDIR\$ SHARED } A(\alpha_1, \ldots, \alpha_d)$$

| where $\alpha_j =$ | : | if Degenerate($\alpha_j$) |
|---|---|---|
| | $w_j{:}\text{BLOCK}$ | if Block($\alpha_j$) |
| | $w_j{:}\text{BLOCK}(B[j])$ | if BlockN($\alpha_j$) |

As described above, each dimension of a dimensionally distributed array is Degenerate (:), Block (:BLOCK) or BlockN (:BLOCK(N)). Each Block or BlockN dimension is assigned a weight ($w_j$) and a block-size (B[j]), with a default of one.

The PEs allocated to each dimension do not sum to the total number of PEs, but rather they must be multiplied. For example, if a two dimensional array is to be distributed over 32 PEs, the available options are to assign one PE to the first dimension and 32 PEs to the second, i.e. 1×32, or 2×16, or 4×8, or 8×4, or 16×2, or 32×1. A degenerate distribution requires that exactly one PE be assigned to that dimension. In the two non-degenerate distributions, the user has the option of specifying the number of PEs to be assigned by using the weight field $w_j$ in the distribution. By interpreting $w_j$ as an exponent of two rather than the number of PEs directly, it also represents the width of the PE field $wP_j$.

Figure 7A:
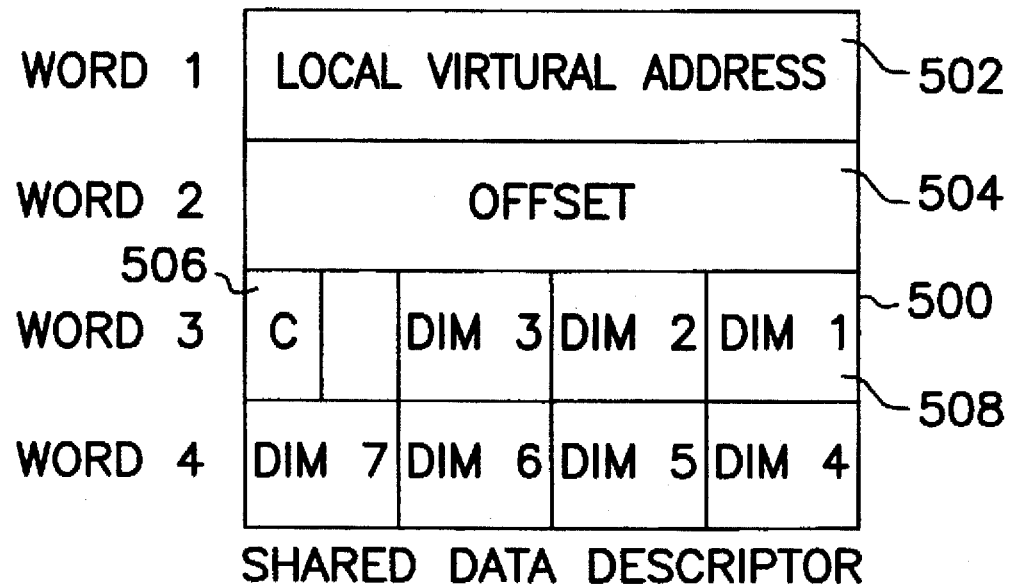
FIG. 7A shows a shared data descriptor (SDD) table.

In the preferred embodiment, the MPP system 100 compiler maintains the above information in a shared data descriptor (SDD) table associated with each data object. One such SDD is illustrated, for example, in FIG. 7A. In FIG. 7A, SDD 500 includes a local base address 502, a linearized index, or offset 504, a canonical bit 506 and up to seven dimension information fields 508. In one embodiment local base address 502 is a 48 bit field which is used as a local address into a shared segment.

Offset 504 is the linearized index of this element of the shared array. Canonical bit 506 is a 1 bit field which is set to 0 if each dimension is distributed individually, to 1 otherwise. An array in which each dimension is distributed individually is said to be a "dimensionally distributed" array. Dimension information fields 508 describe the shared array in each of its dimensions. Dimension information fields 508 are broken down into three subfields as shown in FIG. 7B.

In one embodiment the distribution algorithm treats the array as if it were a one-dimension array, regardless of the array's declared rank. In one such embodiment the mask is constant, with the block size set to 32 elements and the PE size set to the number of available PEs. Those skilled in the art will readily appreciate that the rank used by the distribution specification need not correspond to the declared rank of the array, and could be of any dimensionality. For instance, in a canonical distribution all dimensions of the array are collapsed into a single dimension distributed across the allocated number of processing elements. In another embodiment it may be advantageous for a canonical distribution to explode one or more dimensions into multiple dimensions in order to gain an advantageous distribution.

Figure 7B:
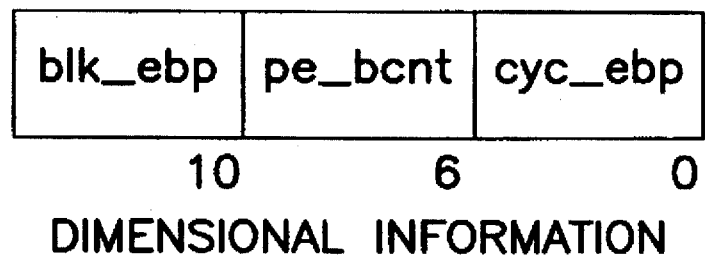
FIG. 7B illustrates dimension information fields within the SDD table of FIG. 7A.

In FIG. 7B, the cyc_ebp (cycle end bit position) field 510 is a 6-bit field used to determine the extent E[n] of a particular dimension n. The formula for calculating cyc_ebp field 510 for dimension n is:

$$\text{cyc\_ebp}(n) = \log_2(E[n]) + \text{cyc\_ebp}(n-1) \quad (1)$$

where cyc_ebp(0)=0
The pe_bcnt (PE bit count) field 512 is a 4 bit field used to determine the number of processors P[n] across which dimension n is distributed. The formula for calculating pe_bcnt field 512 for dimension n is:

$$\text{pe\_bcnt}(n) = \log_2(P[n]) \quad (2)$$

The blk_ebp (block end bit position) field 514 is a 6 bit field used to determine the distribution block size B[n] in dimension n. The formula for calculating blk_ebp field 514 for dimension n is:

$$\text{blk\_ebp}(n) = \log_2(B[n]) + \text{cyc\_ebp}(n-1) \quad (3)$$

In operation, the first field that should be set up is local base address 502. Field 502 should be set with the value returned from, for instance, a shared memory allocation such as a shmalloc() instruction. Offset 504 should generally be set to zero. An SDD initialized in this manner represents both the whole array and its first element. In cases, however, where a routine is trying to set up the SDD so that it points to an array subsection, offset 504 can be used to point to the first element in that subsection. Canonical bit 506 is set to zero for arrays which are dimensionally distributed and is set to 1 for arrays which are not. The remaining fields are dimensional distribution fields 508. They are calculated as given by formulas (1), (2) and (3) above. It should be noted, however, that since the left dimension of a Fortran multidimensional array declaration is the fastest running dimension, its distributional information will be placed in dimensional information field 508.1, with the remaining dimensions placed in consecutively higher number dimension fields 508 to point n.

Hardware Centrifuge

Figure 4A:
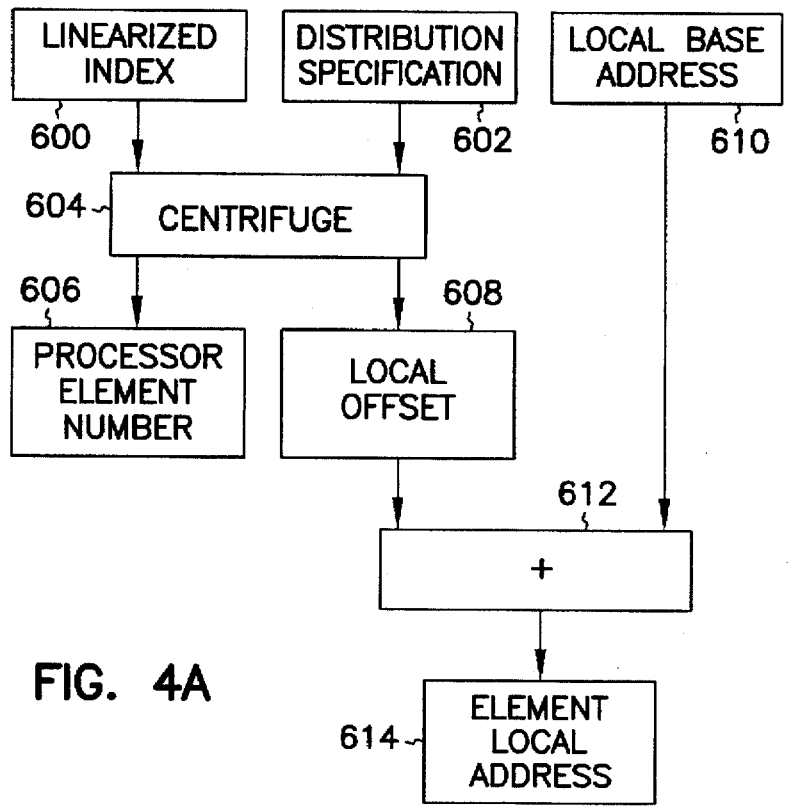
FIG. 4A shows a functional block diagram of a global address calculation
Figure 4B:
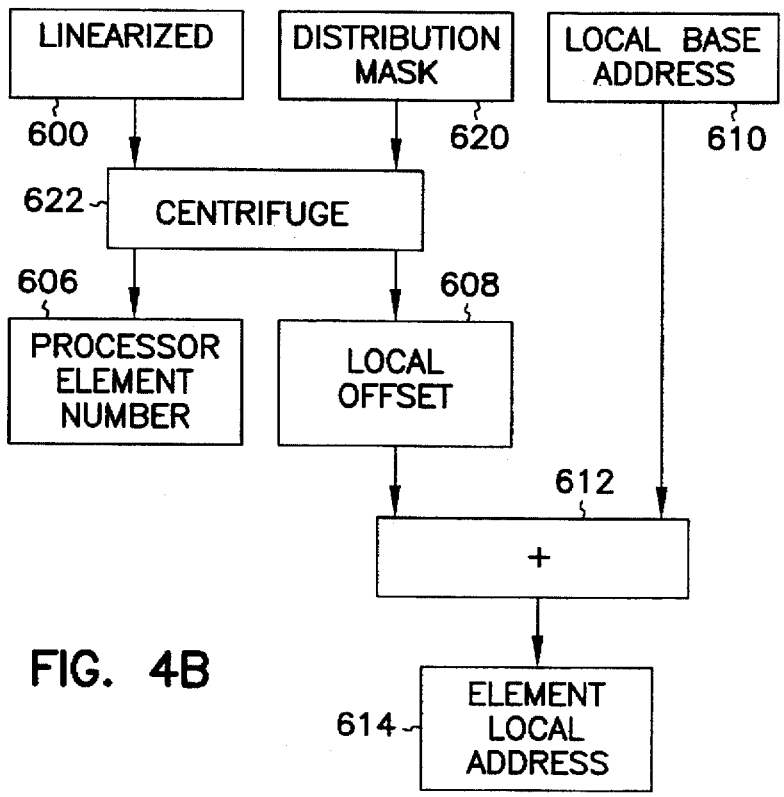
FIG. 4B shows a functional block diagram of one embodiment of a global address calculation with hardware assistance.
Figure 4C:
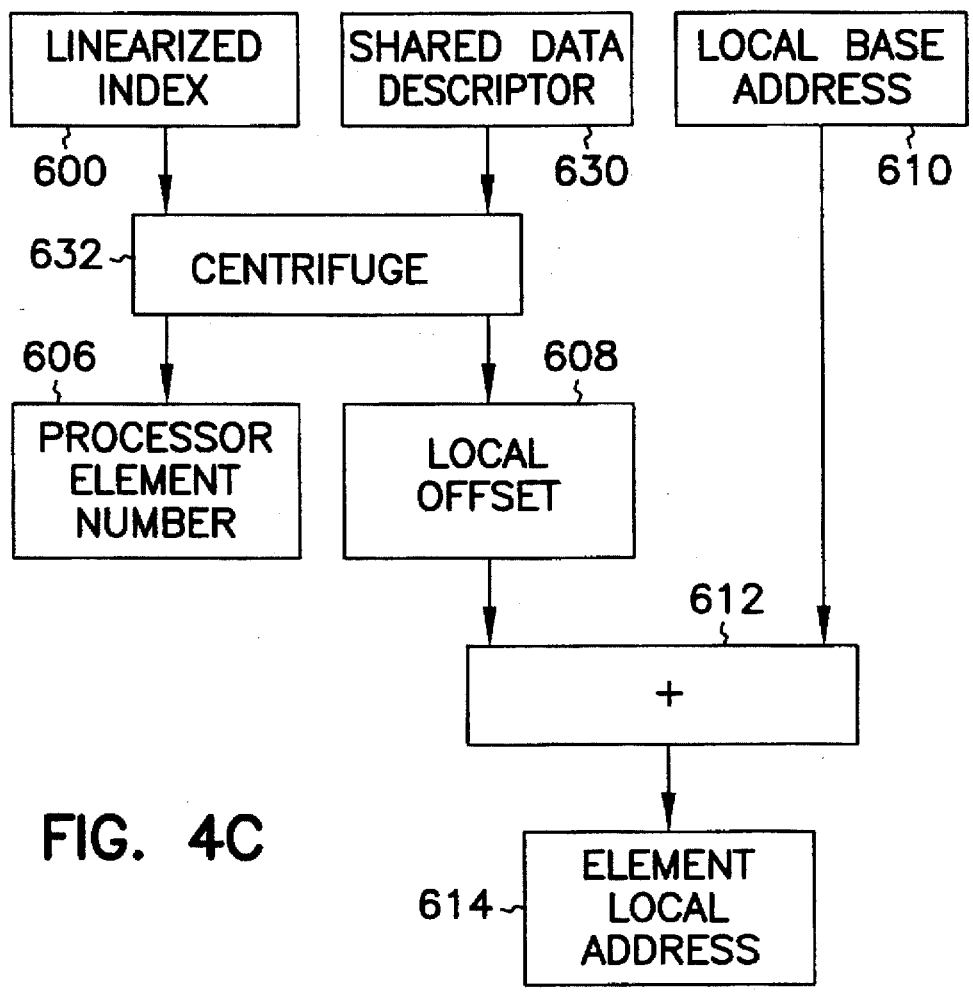
FIG. 4C shows a functional block diagram of one embodiment of a global address calculation in software.

FIG. 4B shows a functional block diagram of a global address calculation which uses a mask 620 to separate the PE number 606 from the local offset 608. The inputs to the centrifuge 622 are a linearized array element index 600 and a distribution mask 620. The index includes the PE number and offset bits combined according to a user defined pattern, with the mask 620 representing that pattern. The outputs from the centrifuge 622 are the separated PE number 606 and local offset 608.

Centrifuge 622 uses the mask 620 to determine which bits of the index are PE number bits and which bits of the index are index offset bits. In one embodiment the mask 620 is developed by examining the distribution specifiers used by the programmer; in such an embodiment, the mask 620 represents the data distribution chosen for that data object.

In one embodiment of an MPP system, the linearized index is a 36-bit value representing an offset into a global array, of which twelve bits are assigned to the PE number, and twenty four bits are assigned to the local offset from the local base address. The centrifuge portion of such an embodiment is illustrated generally in FIG. 5. Those skilled in the art will appreciate that a different number of bits could be assigned as PE number or offset bits, or that the number of bits could be variable, or the sense of the mask bit values could be inverted, without departing from the scope of the present invention.

In the embodiment shown in FIG. 5, a "1" in the mask indicates that the corresponding bit of the index is assigned to the PE number. For example, bit 2 of the mask is set to 1 in FIG. 5. Thus the corresponding bit of the index is a bit assigned to the PE number. If a bit of the mask is set to 0, the corresponding bit of the index is assigned to the local offset. The hardware centrifuge pulls bits from the index where mask bits are set to "1" and compresses them into the 12-bit PE number output. Where the mask bits are set to "0", the hardware centrifuge pulls bits from the index and compresses them into the 24-bit offset. It should be understood that the bit values shown in FIG. 5 are arbitrarily chosen for the sake of illustration. The user can select a number of different data distributions; the mask used will reflect the data distribution selected. This approach gives the programmer great flexibility; he or she can distribute system data throughout memory in almost any simple or complex pattern as will be described in more detail below.

The following equation shows how a centrifuge mask M may be constructed from the above SDD information.

$$M = \sum_{j=1}^{d} ((1 << wP_j) - 1) << eB_j$$

where << indicates shift left for the number of bits ($wP_j$ or $eB_j$) indicated. Because all summands have disjoint bit positions set, the summation could be replaced with a bitwise OR operation.

The centrifuge masks for array A in FIGS. 3A–C can now be calculated. In the distribution of FIG. 3A, each PE receives E[1]/P[1]=16/4 or 4 elements of A. This distribution can be represented as follows:

number of elements=32 cycle=16/4=4

PE=4; and block=1.

Once the number of bits needed to specify the cycle, PE and block size within a particular dimension has been determined, one can derive a mask which can be used to extract PE information from an index and leave behind information relative to the offset within that PE. In the preferred embodiment of the MPP system, 64 bits are used to address into physical memory of MPP 100. The upper 16 bits of that 64 bits contain the PE number, and the remaining 48 bits contain the offset into the PE. Therefore, we need a function that extracts the 16 bits of PE and the 48 bits of offset information from the index. Given the distribution of elements depicted in FIG. 3A, it is possible to come up with an address mask in which the number of cycle bits equals log2(4)=2, the PE number equals log2(2)=2, and block size equals log2(1)=0. Therefore, the PE number can be extracted simply by applying an address mask in which the lower two bits are set to one. Similarly, the offset within that PE can be calculated simply by masking off the lowest two bits and right-shifting the remaining address. The bit masks needed for FIGS. 3A–C are shown in Table 1 below.

TABLE 1

| FIG. | mask | cycle | PE | block | distribution |
|------|------|-------|----|----|--------------|
| 3A | 0011 | 2 | 2 | 0 | :BLOCK(1) |
| 3B | 0110 | 1 | 2 | 1 | :BLOCK(2) |
| 3C | 1100 | 0 | 2 | 2 | :BLOCK or :BLOCK(4) |

By using the above masks, we can now determine that A(7) resides on PE2 with a local offset of 1 for FIG. 3A, resides on PE3 with a local offset of 0 for FIG. 3B and resides on PE1 with a local offset of 2, for example, in FIG. 3C. We have therefore developed an address mask which allows us to find an element within any array for any given data distribution.

An example for a two-dimensional array distributed among eight PEs follows. For 4 PEs assigned to dimension 1 and 2 PEs assigned to dimension 2, the data distribution specifications would be as follows:

REAL A(128, 64)

SHARED A(2:BLOCK(4), 1:BLOCK(2))

where, in this embodiment, the numbers before the BLOCK statements indicate a base two log of the number of PEs assigned to that dimension, and number of bits in the fields of the centrifuge mask are assigned as follows:

```
cycle2 PE2 block2    cycle1 PE1 block1
+----+----+------+-+------+----+-------+
|  4 |  1 |   1  | |   3  |  2 |    2  |
+----+----+------+-+------+----+-------+
``` where cycle1, PE1, and block1 are the three mask fields for dimension 1, the leftmost dimension, and cycle2, PE2, and block2 are the mask fields for dimension 2, the rightmost dimension. The address centrifuge mask would therefore be:

000010 0001100 where the three bits set in the mask indicate the location of PE bits in the corresponding index address. To generate a global address from a reference A(I,J) one would compute (I-1)+128*(J-1) for a linearized index. The linearized index would be centrifuged to form the PE number and local offset. These PE-bits and offset-bits can be used to create the virtual address by adding the offset-bits to the base of A, and using that value to reference a memory location on the PE identified by the PE-bits.

If the actual argument is not distributed, or all dimensions are distributed degenerately, then the address mask should be zero. A zero address mask means that the index expression does not need the PE bits separated from the offset bits.

This ability to arbitrarily define via a software supplied mask the bits in the index address which are to be interpreted as PE number or offset bits provides a simple method for the programmer to specify the most optimal arrangement of data in memory which will result in the most efficient processing of the data for each particular processing task. The fact that the present address centrifuge allows the user to achieve any organization of data through the simple mechanism of a software supplied mask results in an extremely flexible and easy to use mechanism to arrange data throughout memory.

Figure 8:
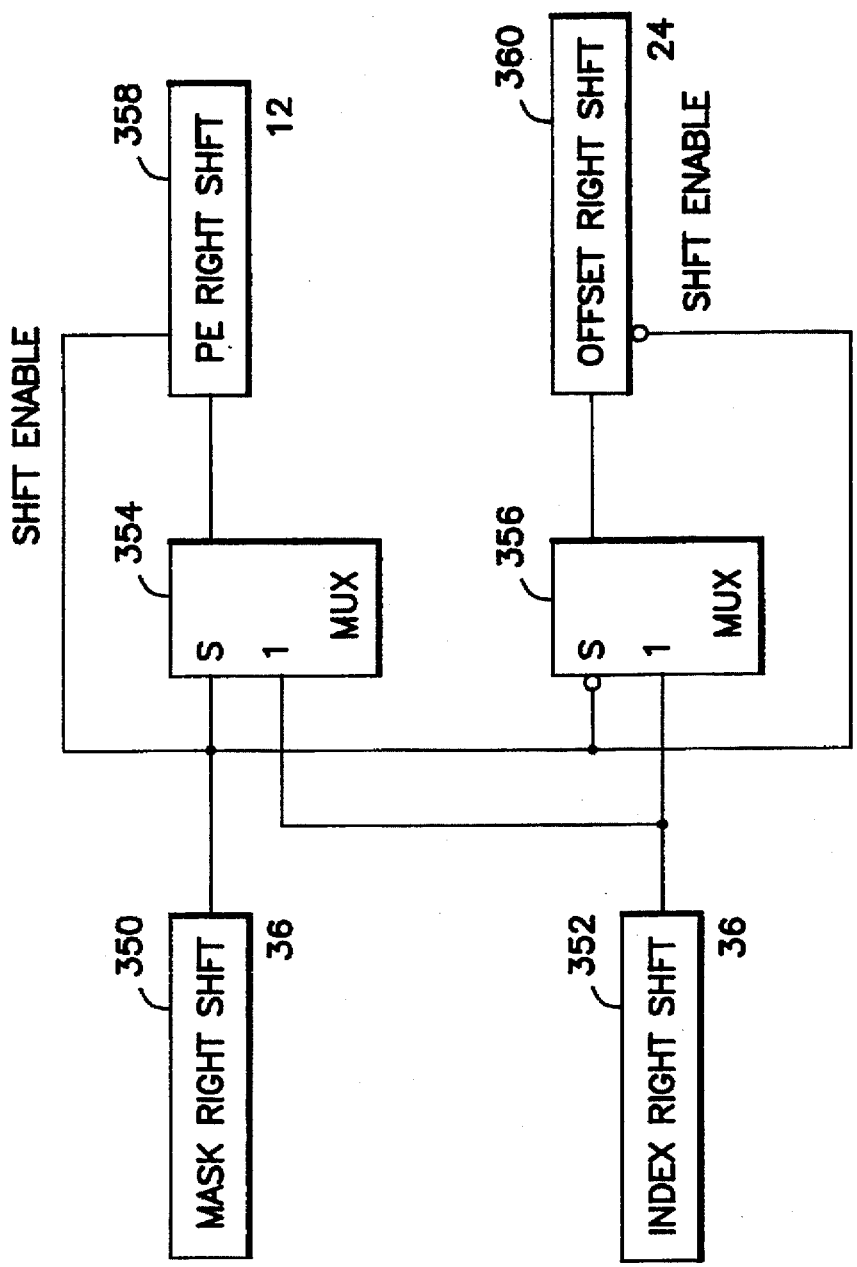
FIG. 8 shows a first embodiment of the hardware design of a serial version of the centrifuge.

The above centrifuge mask can be applied either within a software program or within special hardware set aside for address translation. If the implementation is in software, one separates the PE number from the offset by applying the mask through, for example, testing and shifting individual bits or by other means known to those skilled in the art. If in hardware, a number of approaches is possible. A block diagram of one such approach is shown in FIG. 8. In FIG. 8, the index and mask are processed in a serial fashion, and the index bits are stored as representing either PE number bits or as offset bits, depending on the value of the corresponding mask bit.

In FIG. 8, the 36-bit mask and the 36-bit index are stored in two 36-bit right shift registers 350 and 352, respectively. The bits are shifted out of the registers, one bit at a time using multiplexers 354 and 356, and are input to two result right shift registers 358 and 360. The index and mask bits are simultaneously bit-wise shifted out of shift registers 350 and 352. The bits are shifted from the low order bits to the high order bits. These bits are input to a pair of result shift registers 358 and 360. Register 358 is used to accumulate the PE number bits and is a 12-bit right shift register. Register 360 is used to accumulate the offset bits and is a 24-bit right shift register.

The mask bits enable the shifting for the PE right shift register 358 and the offset right shift register 360. If the mask bit is set to 1, PE right shift 358 is enabled and the corresponding index bit is loaded into the most significant bit in that register. If the mask bit is a 0, offset right shift 360 is enabled and the corresponding index bit is loaded into the most significant bit of that register. Each time a bit is loaded to a result register 358 or 360, a right shift for that register 358 or 360 is enabled. The bits in that register are shifted right one bit position each time a new bit is loaded into the register. The process continues in a serial fashion, shifting and selecting bits until all 36 bits have been shifted out of registers 350 and 352 and into the appropriate result register 358 or 360.

Once all 36 bits of the index and mask are shifted out of registers 350 and 352, the resulting PE number and offset bits are located in their appropriate bit positions in result registers 358 and 360, respectively. The circuit of FIG. 8 outputs a centrifuged address every 36 clock periods.

Figure 9:
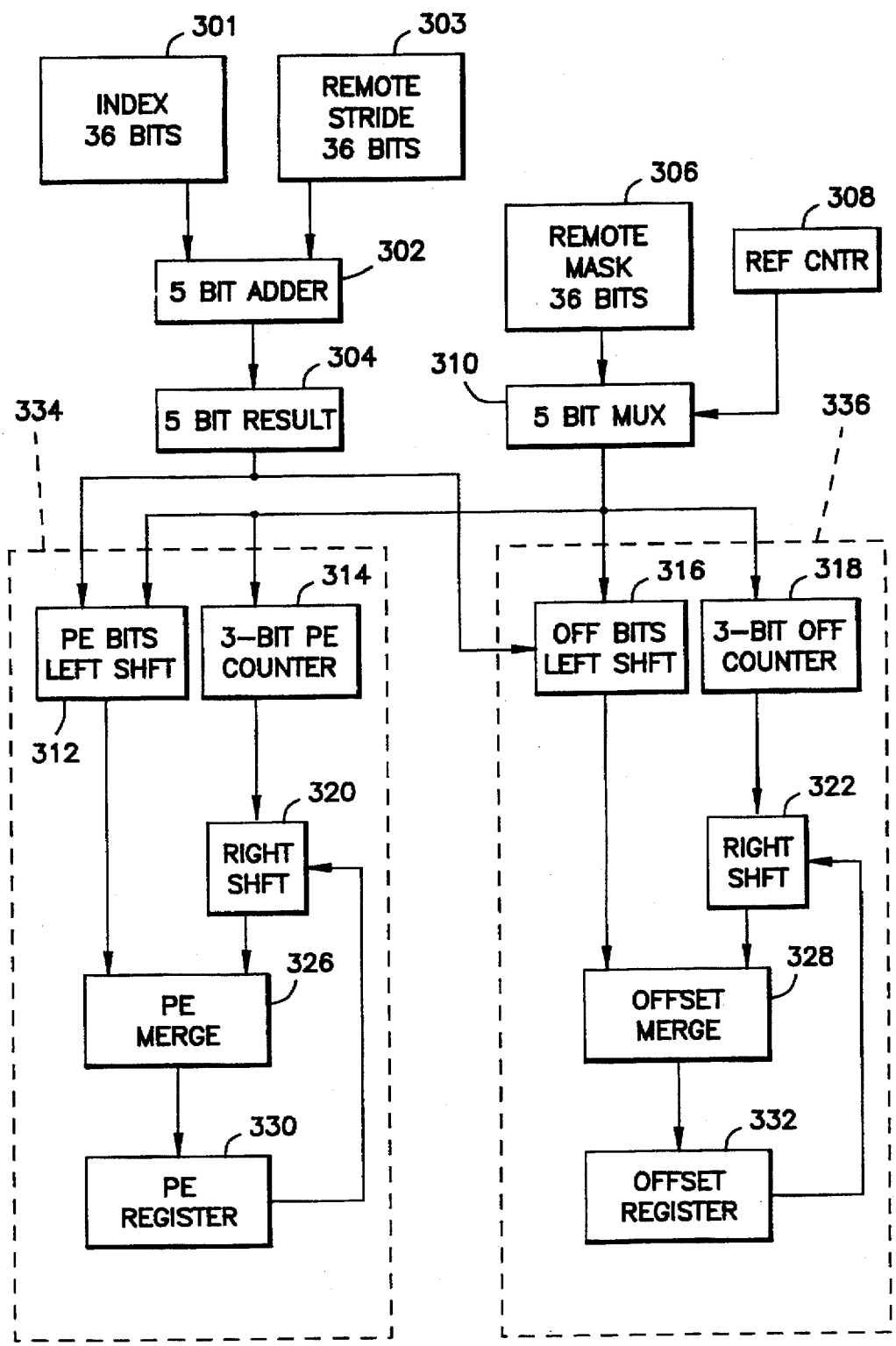
FIG. 9 shows an alternate preferred embodiment of the hardware design of the centrifuge.

FIG. 9 shows a block diagram for an alternate hardware embodiment of the address centrifuge. To shorten the number of clock periods required for the centrifuge to generate an address, the embodiment of FIG. 9 shows a hardware centrifuge implemented as a 5-bit parallel, semi-pipelined unit. The parallel nature and pipelined design of the embodiment shown in FIG. 9 gives it a speed advantage over the embodiment shown in FIG. 8.

As with the embodiment of FIG. 8, the two inputs to the centrifuge in FIG. 9 comprise the index and mask. Index register 301 contains the 24 address offset bits and the 12 PE number bits in an arbitrary interleave as designated by the mask which is stored in mask register 306. The outputs from the centrifuge are a 12-bit PE number and separate 24-bit address offset, stored in registers 330 and 332, respectively.

The centrifuge in the embodiment of FIG. 9 is preferably implemented as a 5-bit-per-clock semi-pipelined unit. It generates a result every 8 clock periods. The centrifuge of FIG. 9 operates on 5-bit slices of the index and the mask, starting from the low order bits to the high order bits. The centrifuge operates on each of the 5 bits of the current slice in parallel. In addition, the centrifuge is semi-pipelined, which further increases the speed with which a result is obtained.

Before being applied to the centrifuge, an index is generated by repeatedly adding a remote stride 303 (discussed in more detail below in connection with FIG. 12) to the index 301. Adder 302 is preferably semi-pipelined, and adds 5 bits per clock period (from least significant to most significant bits) and in the preferred embodiment requires 8 clock periods to produce a result. The 5-bit slices of the result are fed into the centrifuge at input register 304.

The mask is static for the duration of the block transfer. A 3-bit slice counter 308 counts from 0 to 7 synchronously with the control that is selecting 5-bit slices of the index and selects matching 5-bit slices of the mask using a 5-bit multiplexor 310. Thus, when bits 0–4 of the index are input to the centrifuge from register 304, bits 0–4 of the mask are also input to the centrifuge from 5-bit multiplexor 310. The mask slice joins the index slice in each of two pipelines: the PE pipe, designated by phantom line 334 and the offset pipe designated by phantom line 336.

Following the slice through PE pipe 334, the mask bits are used to control the compression of all of the index bits where mask bits are set to 1, and eliminating all of the index bits where the mask bits were 0. The result is 0 to 5 bits of the PE number (depending on how many mask bits were set) left-justified in left shift register 312. The operation of left shift register will be described in more detail below in connection with FIGS. 10A–10E.

At the same time, the number of 1 bits set in the current 5-bit slice of the mask are counted by shift counter 314. Thus counter 314 counts how many bits of the current 5-bit slice of the index are PE bits. This value is used as a shift count input to right shift register 320. Shift register 320 shifts the accumulated PE number stored in PE register 330 (discussed below) by the number of PE bits in the current 5-bit slice of the index as determined by counter 314. The accumulated index in register 320 is then "merged" with the next 5-bit slice left justified in register 312 by PE merge function 326. PE merge function 326 is preferably implemented using a bit-wise OR of the bits in registers 312 and 320 to arrive at an accumulated PE number which is then stored in the 12-bit PE register 330. The accumulated PE number is then fed back and loaded into the most significant bit positions of right shift register 320. These bits are then shifted again to make room for the PE number bits from the next 5-bit slice of the index from register 312.

The offset pipeline 336 works in a manner similar to PE pipeline 334. However, the mask bits are complemented, that is, the mask bits that are 0s are counted in shift counter 318 and are the bits that control the gating of data in left shift register 316 and offset merge 328. In addition, right shift register 322. Also, offset register 332 is a 24 bit register instead of a 12-bit register. Otherwise, offset pipeline 336 works in the same manner as described above for PE pipeline 334.

In the preferred implementation, exactly 12 bits must set as the PE number and exactly 24 bits must be set as offset in the mask for the centrifuge to function correctly. The PE and offset fields are thus of a fixed bit length. However, it shall be understood that variable length PE and offset fields could be used without departing from the scope of the present invention.

FIGS. 10A–10E show detailed diagrams of the combinational logic used to implement PE left shift register 312. Each of the five bits, 0–4 are generated using the combinational logic functions shown in FIGS. 10A–10E, respectively.

Figure 10A:
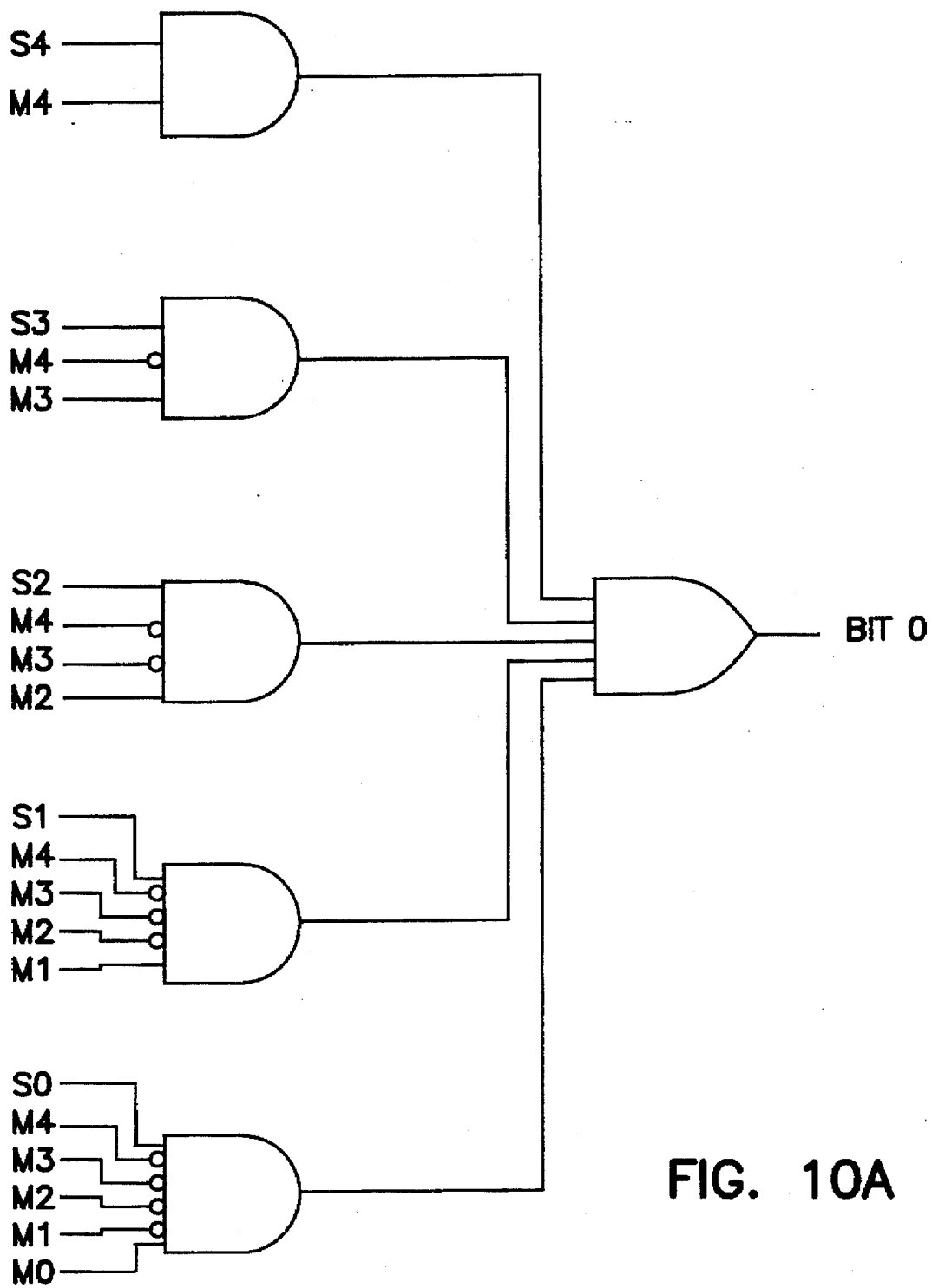
FIGS. 10A–10E show a more detailed block diagram of left shift register 312.

FIG. 10A shows the combinational logic used to generate bit 0 of left shift register 312. The boolean equation for the logic shown in FIG. 10A is as follows:

| BIT 0 = | S4 | M4 | | | | |
|---|---|---|---|---|---|---|
| + | S3 | M4' | M3 | | | |
| + | S2 | M4' | M3' | M2 | | |
| + | S1 | M4' | M3' | M2' | M1 | |
| + | S0 | M4' | M3' | M2' | M1' | M0 |

Figure 10B:
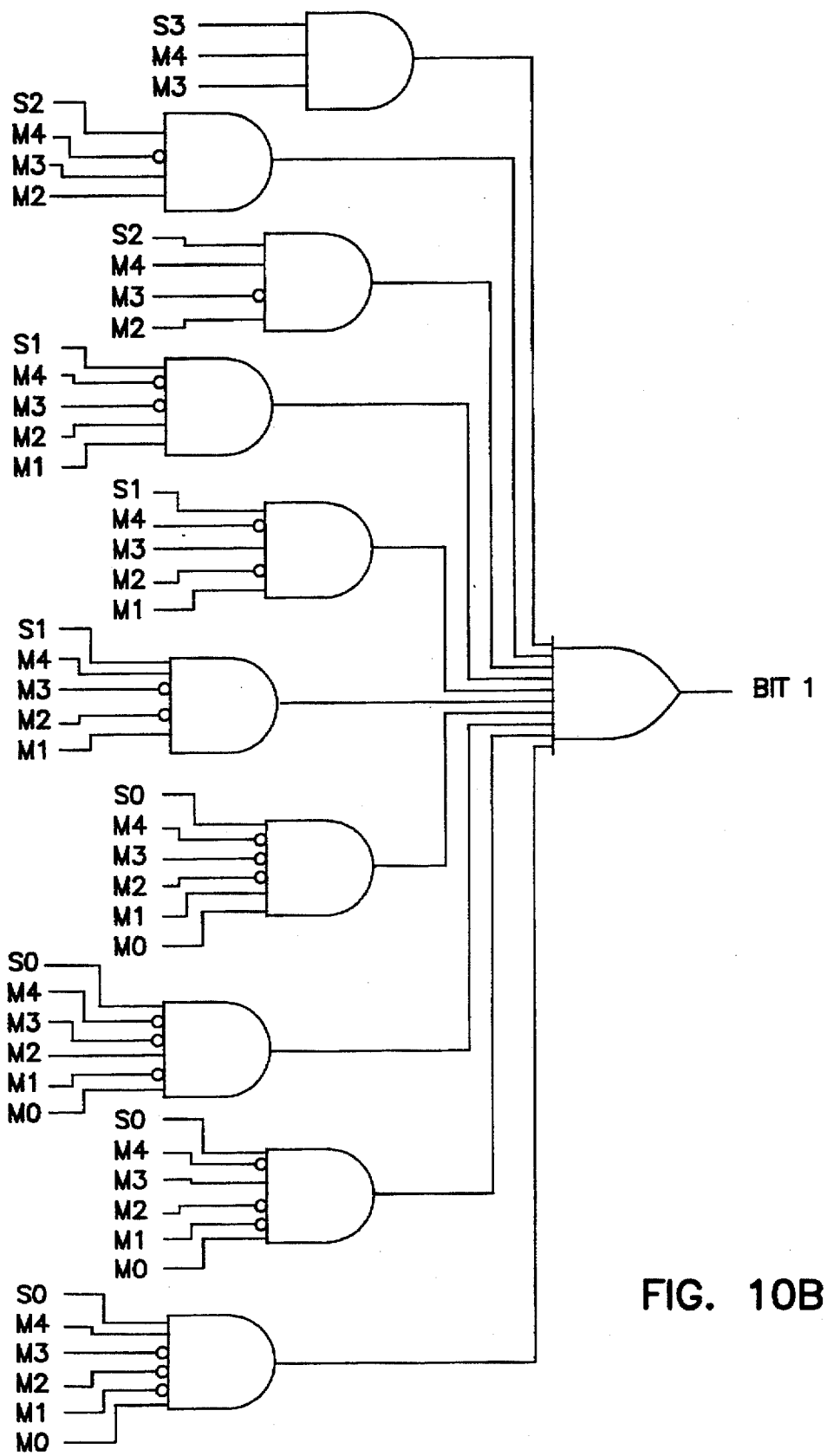

FIG. 10B shows the combinational logic used to generate bit 1 of left shift register 312. The equation for the logic shown in FIG. 10B is as follows:

| BIT 1 = | S3 | M4 | M3 | | | |
|---|---|---|---|---|---|---|
| + | S2 | M4' | M3 | M2 | | |
| + | S2 | M4 | M3' | M2 | | |
| + | S1 | M4' | M3' | M2 | M1 | |
| + | S1 | M4' | M3 | M2' | M1 | |
| + | S1 | M4 | M3' | M2' | M1 | |
| + | S0 | M4' | M3' | M2' | M1 | M0 |
| + | S0 | M4' | M3' | M2 | M1' | M0 |
| + | S0 | M4' | M3 | M2' | M1' | M0 |
| + | S0 | M4 | M3' | M2' | M1' | M0 |

Figure 10C:
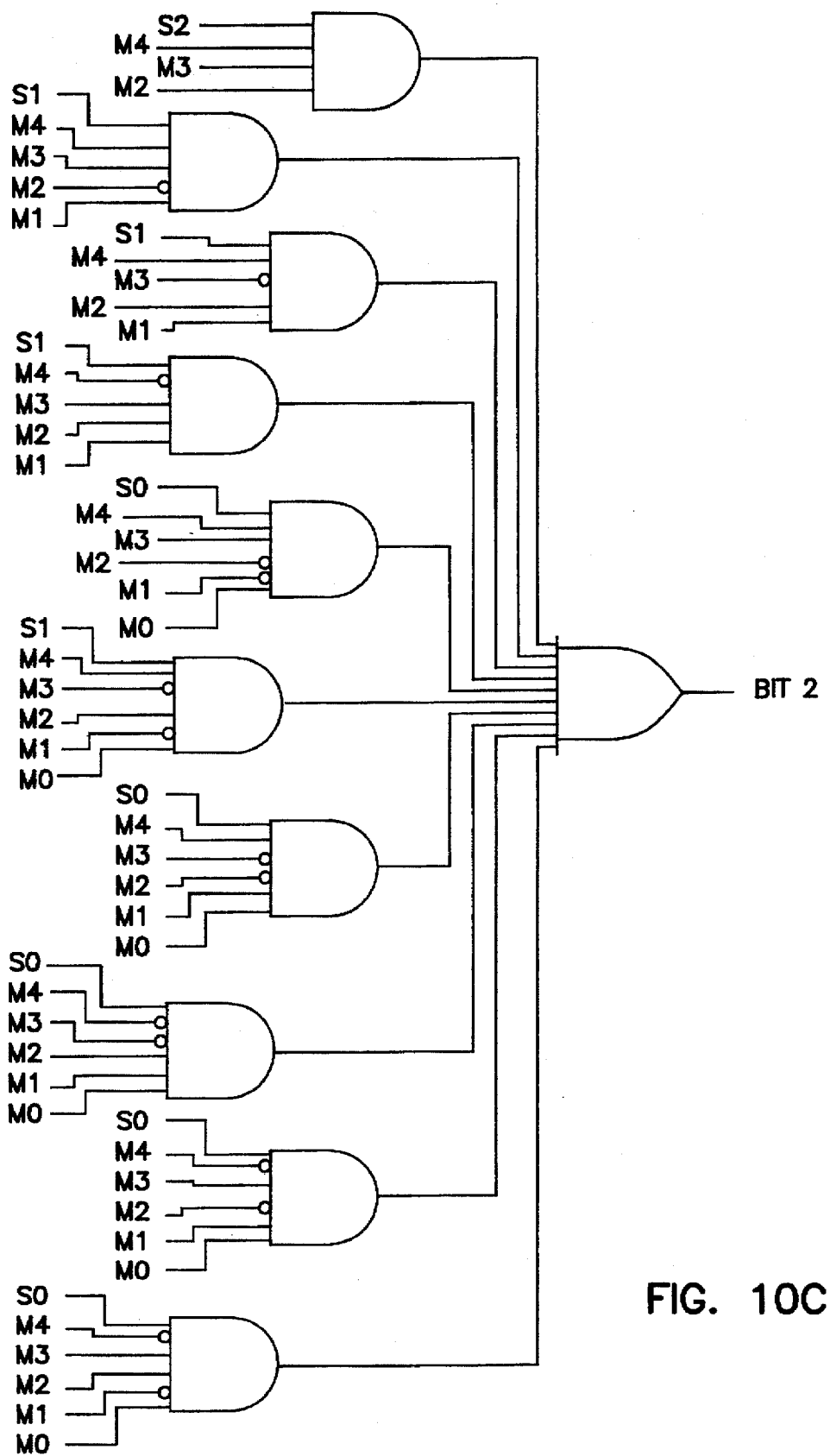

FIG. 10C shows the combinational logic used to generate bit 2 of left shift register 312. The equation for the logic shown in FIG. 10C is as follows:

| BIT 2 = | S2 | M4 | M3 | M2 | | |
|---|---|---|---|---|---|---|
| + | S1 | M4 | M3 | M2' | M1 | |
| + | S1 | M4 | M3' | M2 | M1 | |
| + | S1 | M4' | M3 | M2 | M1 | |
| + | S0 | M4 | M3 | M2' | M1' | M0 |
| + | S0 | M4 | M3' | M2 | M1' | M0 |
| + | S0 | M4 | M3' | M2' | M1 | M0 |
| + | S0 | M4' | M3' | M2 | M1 | M0 |
| + | S0 | M4' | M3 | M2' | M1 | M0 |
| + | S0 | M4' | M3 | M2 | M1' | M0 |

Figure 10D:
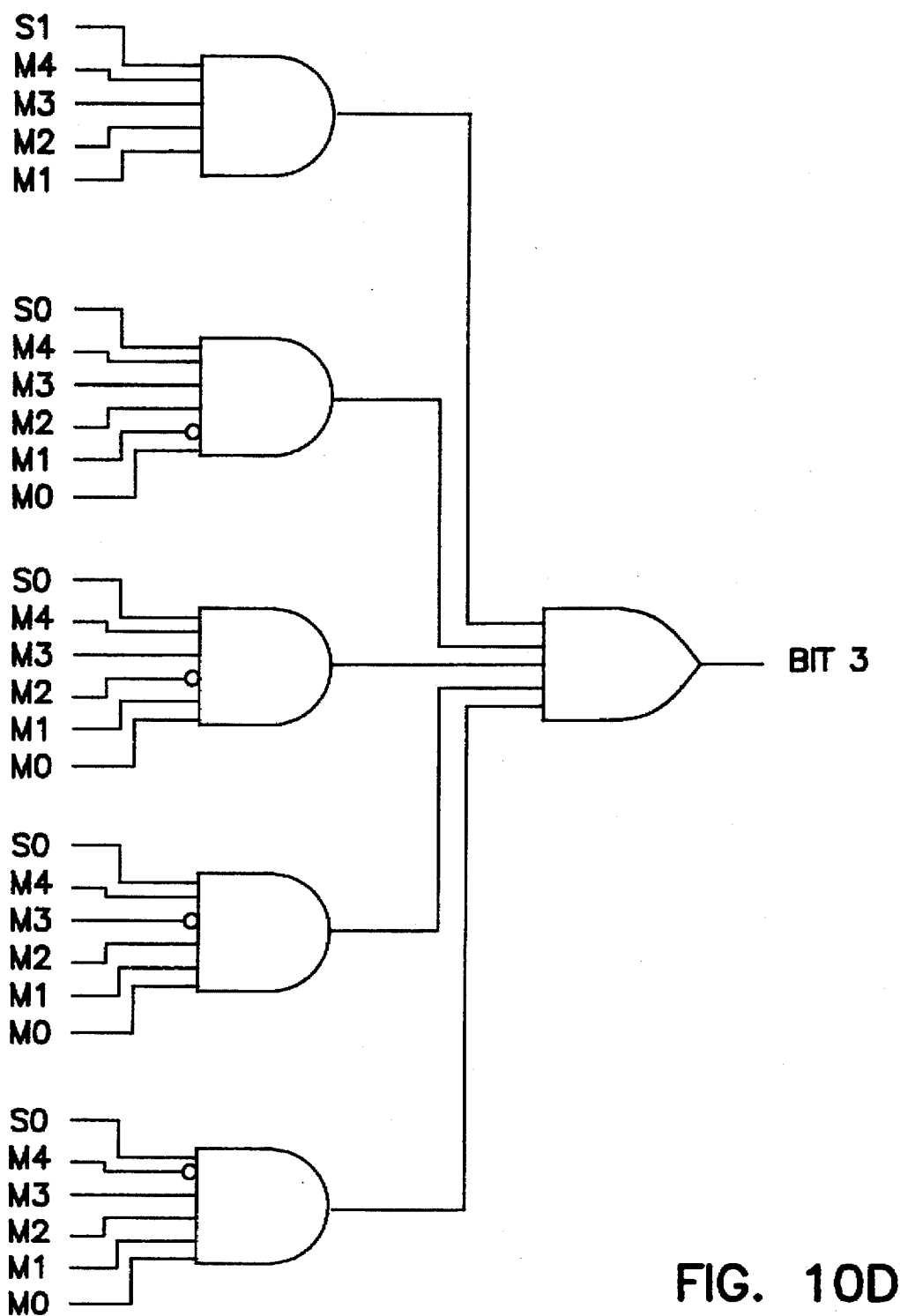

FIG. 10D shows the combinational logic used to generate bit 3 of left shift register 312. The equation for the logic shown in FIG. 10D is as follows:

| BIT 3 = | S1 | M4 | M3 | M2 | M1 | |
|---|---|---|---|---|---|---|
| + | S0 | M4 | M3 | M2 | M1' | M0 |
| + | S0 | M4 | M3 | M2' | M1 | M0 |
| + | S0 | M4 | M3' | M2 | M1 | M0 |
| + | S0 | M4' | M3 | M2 | M1 | M0 |

Figure 10E:
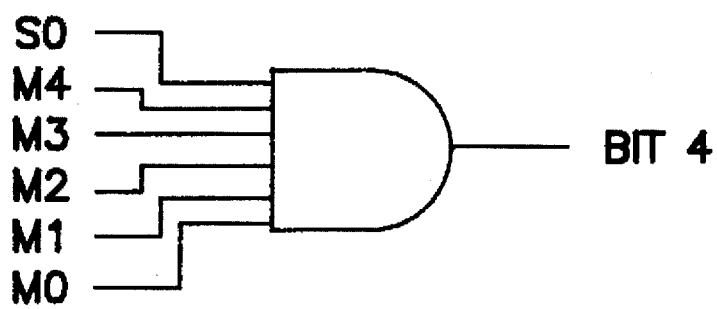

FIG. 10E shows the combinational logic used to generate bit 4 of left shift register 312. The equation for the logic shown in FIG. 10E is as follows:

BIT 4=S0 M4 M3 M2 M1 M0

Those of skill in the art will readily understand that offset left shift register 316 works in a manner similar to that of PE left shift register 312, except that the mask bits that are set to 0 are counted by 3-bit counter 318 and are the bits that control the gating of data into offset left shift register 316 and offset merge 328.

Software Centrifuge

A method which depends on testing and shifting bits in software can become software can become overly time consuming. To avoid this, an alternate software embodiment is provided as described below.

The software centrifuge operation computes the home PE, P(x), and element offset, E(x), of an element of a distributed array A, where x denotes a vector of zero based index values, i.e., index values after the appropriate lower bounds have been subtracted. A formula for calculating the PE number and offset is as follows:

$$P(x) = \sum_{j=1}^{d} P_j(x) << \left( \sum_{i=1}^{j-1} wP_i \right) \quad (4)$$

where $$P_j(x) = \begin{cases} 0, & \text{if Degenerated}(\alpha_j) \\ x_j >> wB_j, & \text{if Block}(\alpha_j) \\ (x_j >> wB_j) \& mP_j, & \text{if BlockN}(\alpha_j) \end{cases} \quad (5)$$

and $$E(x) = \sum_{j=1}^{d} E_j(x) << \left( eC_{j-1} - \left( \sum_{i=1}^{j-1} wP_i \right) \right)$$

where $$E_j(x) = \begin{cases} x_j, & \text{if Degenerate}(\alpha_j) \\ x_j \& mB_j, & \text{if Block}(\alpha_j) \\ (x_j \& mB_j) | ((x_j >> wP_j) \& \sim mB_j), & \text{if BlockN}(\alpha_j) \end{cases}$$

where

| $eC_o$ | (for uniformity) | 0 |
| $wB_j$ | width of Block bits | $eB_j - eC_{j-1}$ |
| $mP_j$ | PE-number mask | $(1 << wP_j) - 1$ |
| $mB_j$ | Block bits mask | $(1 << wB_j) - 1$ | and where $\&$, $|$, $>>$, $<<$, and $\sim$ are the bitwise logical operations AND, OR, right shift, left shift, and NOT, respectively.

Argument displacements aP, aE and aD are derived from the SDD and the associated extents as detailed in equations 6 through 9 below. These values are 0, 0 and 0 for non-arguments. Equation 6 shows how the dimension j component of the element offset is derived from the SDD offset. The notation V[i:j] indicates a vector section, in the tradition of Fortran 90 array syntax. Below f denotes the number of declared dimensions of the formal parameter; f is 0 for a formal scalar. Equations 7 and 8 are the PE and LVA adjustments for those dimensions of the actual parameter beyond dimension f, while 9 is the displacement adjustment before for the declared dimensions of the formal parameter. These quantities are required for the final PE/LVA computation.

$$D_j = (SDD.offset \& ((1 << eC_j) - 1)) >> eC_{j-1} \quad (6)$$

$$aP = P(D[f+1:7]) \quad (7)$$

$$aE = E(D[f+1:7]) \quad (8)$$

$$aD = D[1:f] \quad (9)$$

The PE and LVA can now be calculated in terms of the centrifuge primitives P and E, and the displacement adjustments, aP, aE, and aD.

$$PE(A(I)) = aP + P(I-L+aD) \quad (10)$$

$$LVA(A(I)) = Base(A) + (aE + E(I-L+aD)) * Size(A(I)) \quad (11)$$

In equations 10 and 11, L is the vector of least element indexes for each dimension.

Recursive Centrifuge

Yet another embodiment of the present address centrifuge will now be explained. A recursive centrifuge system may be implemented to reduce the number of logic gates required in the previous brute force combinational implementation as illustrated in FIGS. 10A–10E. A general discussion of the recursive centrifuge concept is necessary to lay the foundation for the following disclosures of the hardware embodiment of the recursive centrifuge.

Figure 11:
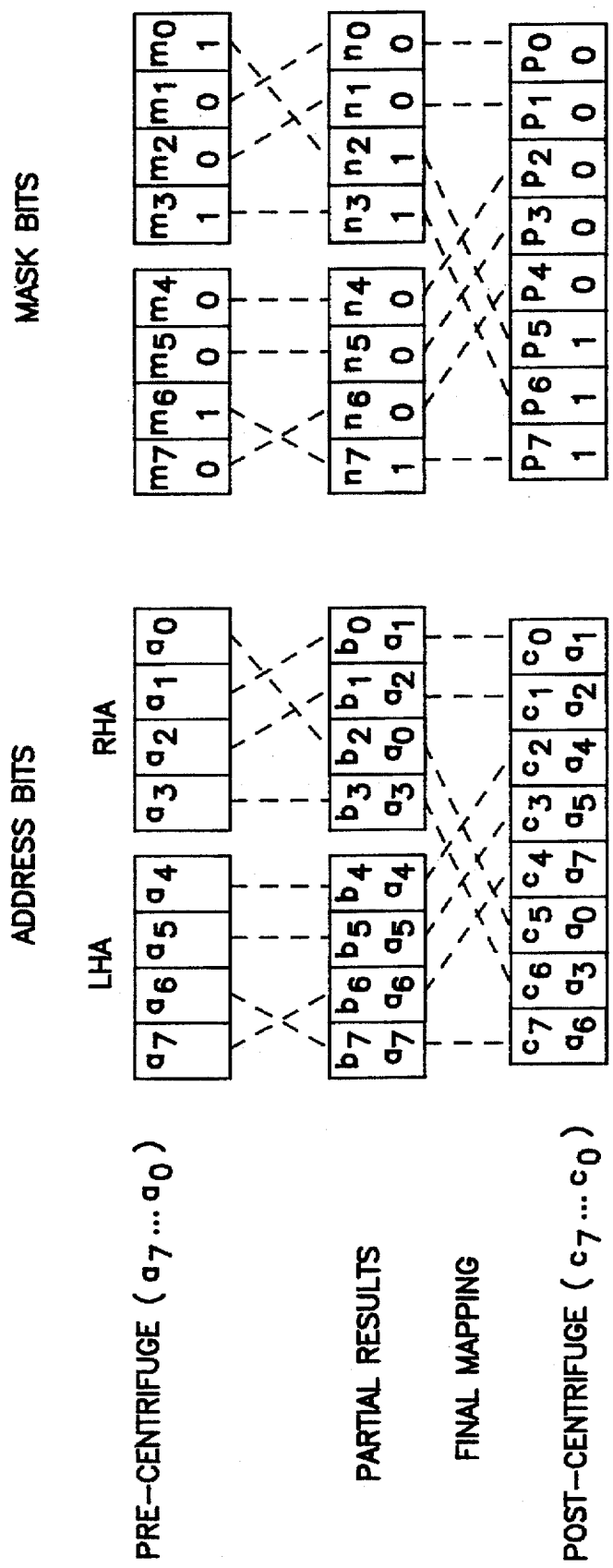
FIG. 11 shows a functional block diagram of one embodiment of a modified centrifuge operation.

First, consider a modified centrifuge function which recieves a pair of partial results which have already been separately centrifuged. An example of the modified centrifuge function is shown in FIG. 11. The function combines the two previously centrifuged partial results and returns the fully centrifuged result. The original pre-centrifuged address and associated mask are divided into two partial results which are independently centrifuged. This means that all PE bits (mask bits value 1) are in the left most bits of the partial result left hand argument (LHA), and all offset bits (mask bits value 0) are in the right most bits of the partial result right hand argument or (RHA).

The mapping from the partial results to the final result is also shown in FIG. 11. Note that the PE bits of the LHA and the offset bits of the RHA do not shift position in the final mapping. In general, only the PE bits of the RHA and the offset bits of the LHA will shift position. This is because the RHA and LHA have already been separately centrifuged and therefore the PE bits of the LHA ($b_7$ in the example of FIG. 11) and the offset bits of the RHA ($b_1$ and $b_0$ in the example of FIG. 11) are already in the correct position before the modified centrifuge operation takes place. Further, the number of bit positions which the PE bits of the RHA (bits $b_3$ and $b_2$ in the example of FIG. 11) must move to the left is equal to the total number of offset bits in the LHA which is simply the number of zeroes of the LHA of the mask (three in the example of FIG. 11). Likewise, the number of bit positions which the offset bits of the LHA (bits $b_6$, $b_5$ and $b_4$ in the example of FIG. 11) must move to the right is simply the total number of PE bits in the RHA or the number of ones of the RHA of the mask (two in the example of FIG. 11).

In addition, because the associated RHA and LHA masks are organized (i.e., already centrifuged), it is not necessary to arithmetically count the number of zeroes in the LHA or ones in the RHA. Only the location of the 0 to 1 transition, i.e., the bit position at which a PE bit is adjacent to an offset bit, need be determined. As a result, no complex arithmetic circuitry such as counters or adders are required to implement the recursive centrifuge. Instead, a simple sum-of-products expression can be used to detect the PE/offset boundary in each partial result mask. These characteristics result in a centrifuge implementation having significantly lower gate counts and associated levels of logic, and a corresponding increase in the speed in which a centrifuged result is obtained.

Figure 12:
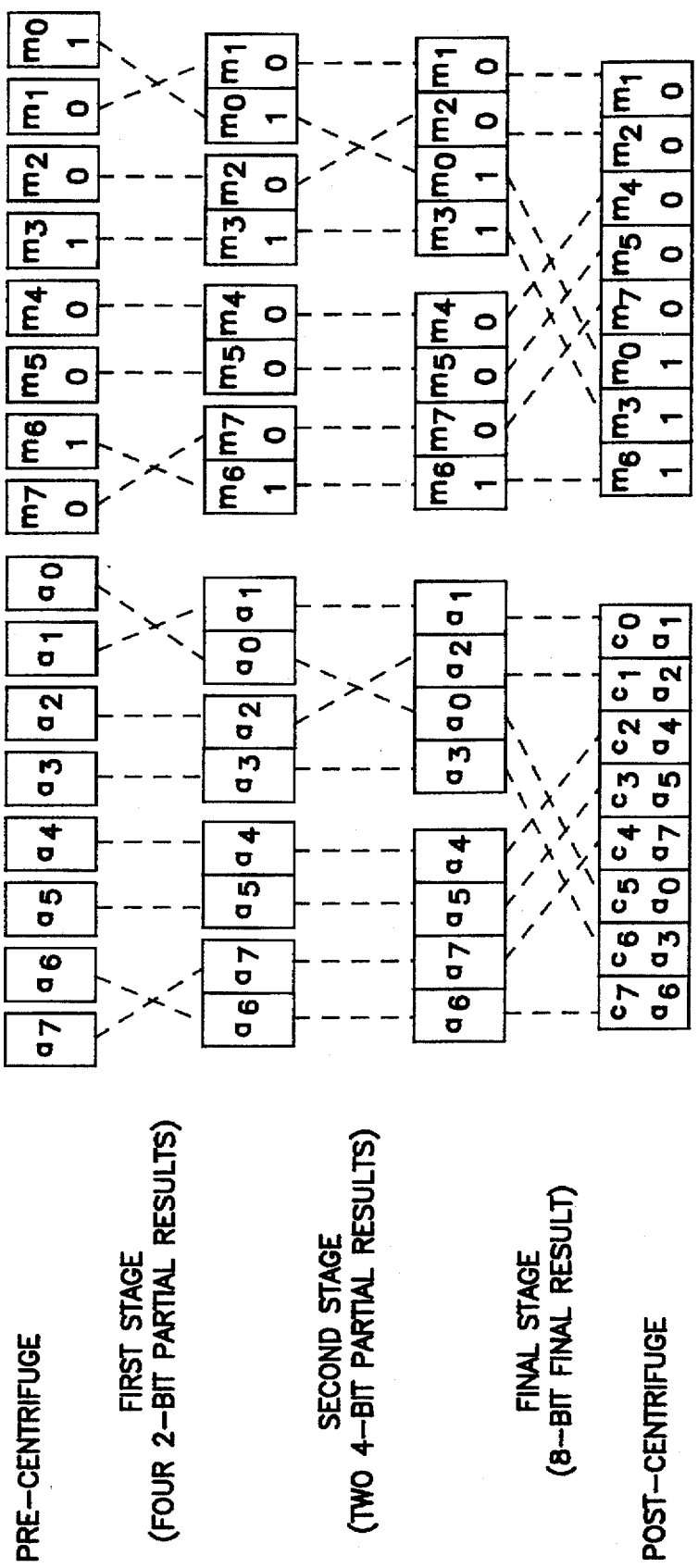
FIG. 12 shows a functional block diagram of one embodiment of an 8-bit fully recursive centrifuge.

This modified function centrifuge can be expanded using the concept of recursion in order to produce a fully centrifuged result from an arbitrary set of operands. The implementation is recursive in the sense that each stage operates on partial results which were centrifuged in the previous stage. FIG. 12 shows a fully recursive centrifuge operation using the same example as shown in FIG. 11. The full result is produced by generating 2-bit partial results at the first centrifuge stage, then 4-bit partial results at the second stage, then 8-bit partial results at the third stage (the final stage in the example of FIG. 11) and so on until the last stage produces a single fully centrifuged address. The corresponding centrifuged mask is carried along at each stage and can be disposed of after the centrifuge operation is complete.

Figure 13:
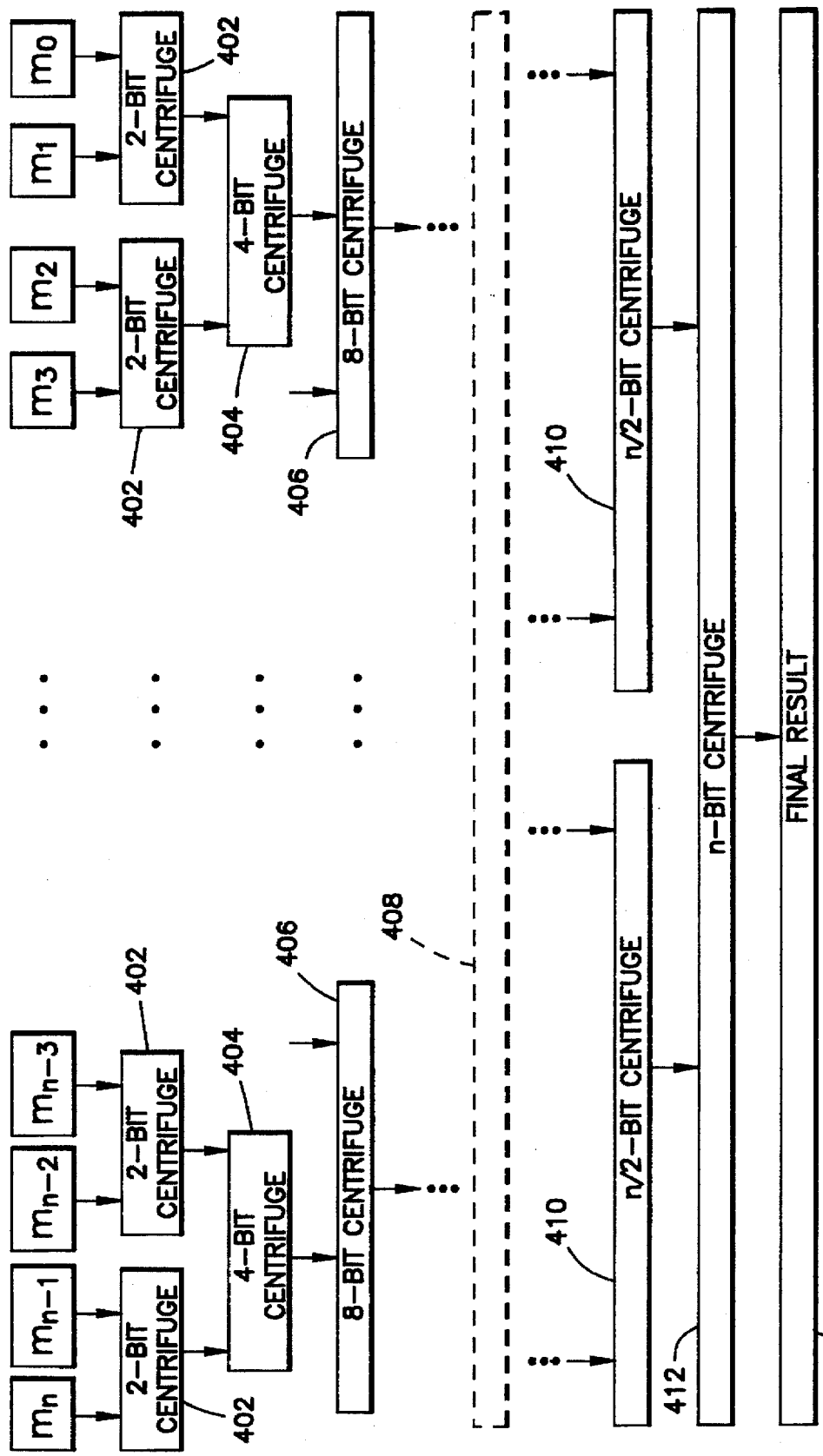
FIG. 13 shows a top level block diagram of one embodiment of a recursive address centrifuge.

FIG. 13 shows a block diagram of one embodiment of the recursive address centrifuge. The n-bit index address and n-bit mask are first input to a series of 2-bit centrifuges 402. Each 2-bit centrifuge 402 receives a group of two bits of the index address and the mask and outputs a two-bit centrifuged result as described above with respect to FIG. 12. The outputs of two 2-bit centrifuge circuits 402 are input to a series of 4-bit centrifuge circuits 404, each of which output a centrifuged four bit result.

Additional layers of centrifuge 408 are present as needed to arrive at the required size n-bit centrifuge. The final n-bit centrifuge stage 412 processes the results from two n/2-bit centrifuge stages 410 to produce the final n-bit fully centrifuged result 414.

Power-of-two bit subdivisions of the address were used for instructional purposes in this description of the recursive centrifuge, however, those skilled in the art will readily appreciate that the partial arguments need not be subdivided in power-of-two numbers of bits.

A hardware embodiment of the recursive centrifuge may be realized by implementing each stage of the recursive centrifuge using simple sum-of-products expressions of the mask and index addresses. To generate the sum-of-products expressions for the recursive centrifuge, the origin of each resulting bit in the post-centrifuged address is determined. A direct derivation of the associated boolean equations proceeds in the following manner.

For each right hand result (RHR) bit three factors are evaluated: (1) whether the corresponding pre-centrifuge bit (i.e., the RHA bit) is an offset or PE bit; (2) how many PE bits are to the right of the corresponding how mat; and (3) how many offset bits are in the LHA. This is because an RHR bit can acquire its value from any of three places: (1) from the corresponding bit in the RHA; (2) from a PE bit in the RHA to the right of the position in question; or (3) from one of the offset bit positions in the LHA.

Similarly, the left hand result (LHR) assignments depend on (1) the corresponding LHA bit, (2) the number of offset bits to its left, and (3) the total number of PE bits in the RHA. These considerations can be expressed by the following pseudocode:

```
/* determine the right hand address result (RHR) */
for (each bit "j" in the RHR) {
    if (the corresponding RHA bit [in position "j"] is an offset bit)
        {RHR bit "j" = RHA bit "j"}
    else if (total # LHA offset bits > # PE bits to the right of RHA bit "j")
        {RHR bit "j" = LHA bit to the right of "j" by total # of RHA offset bits}
    else
        {RHR bit "j" = RHA bit to the right of "j" by total # of LHA offset bits}
}
/* determine the left hand address result (LHR) */
for (each bit "j" in the LHR){
    if (the corresponding LHA bit [in position "j"] is a PE bit)
        {LHR bit "j" = LHA bit "j"}
    else if (total # RHA PE bits ># offset bits to the left of LHA bit "j")
        {LHR bit "j" = RHA bit to the left of "j" by total # of LHA PE bits}
    else
        {LHR bit "j" = LHA bit to the left of "j" by total # of RHA PE bits}
}
```

The associated mask results may be determined by evaluating all combinations of the LHA and RHA mask bits which would produce a PE mask result bit. The address result and mask result equations pseudocode representation can be implemented in boolean notation as a set of simple sum-of-products expressions where the PE and offset bit counts are effectively pre-computed due to the nature of the already centrifuged right hand and left hand arguments. The boolean equations shown in Table 2 produce an 8-bit address/mask result from a pair of 4-bit partial result address/mask arguments. Thus, the boolean equations shown in Table 2 are an implementation of the 8-bit centrifuge stage 406 shown in FIG. 13. The LHA address is "$b_{4-7}$", the LHA mask is "$n_{4-7}$", the RHA address is "$b_{0-3}$", and the RHA mask is "$n_{0-3}$". The result address is "$c_{0-7}$" while the result mask is "$P_{0-7}$" (also refer to the example shown and described above with respect to FIG. 11).

TABLE 2

| centrifuged address result | comment | centrifuged mask result |
|---|---|---|
| c0 =b0 $\overline{n0}$ | offset bit, no change | p0 =n4 n0 |
| +b0 n0 $\overline{n4}$ | PE bit, new bit comes from RHA | |
| +b4 $\overline{n0}$ n4 | PE bit, new bit comes from LHA | |
| c1 =b1 $\overline{n1}$ | offset, no change | p1 =n4 n1 |
| +b0 n0 n5 $\overline{n4}$ | PE, from RHA | +n5 $\overline{n0}$ |
| +b1 n1 $\overline{n4}$ | | |
| +b4 n1 $\overline{n0}$ $\overline{n4}$ | PE, from LHA | |
| +b5 $\overline{n0}$ n5 | | |
| c2 =b2 $\overline{n2}$ | offset, no change | p2 =n4 n2 |
| +b0 n0 n6 $\overline{n5}$ | PE, from RHA | +n5 n1 |
| +b1 n1 n5 $\overline{n4}$ | | +n6 $\overline{n0}$ |
| +b2 n2 $\overline{n4}$ | | |
| +b4 n2 $\overline{n1}$ $\overline{n4}$ | PE, from LHA | |
| +b5 n1 $\overline{n0}$ $\overline{n5}$ | | |
| +b6 $\overline{n0}$ $\overline{n6}$ | | |
| c3 =b3 $\overline{n3}$ | offset, no change | p3 =n4 n3 |
| +b0 n0 n7 $\overline{n6}$ | PE, from RHA | +n5 n2 |
| +b1 n1 n6 $\overline{n5}$ | | +n6 n1 |
| +b2 n2 n7 $\overline{n6}$ | | +n7 $\overline{n0}$ |
| +b3 n3 $\overline{n4}$ | | |
| +b4 n3 $\overline{n2}$ $\overline{n4}$ | PE, from LHA | |
| +b5 n2 $\overline{n1}$ $\overline{n5}$ | | |
| +b6 n1 $\overline{n0}$ $\overline{n6}$ | | |
| +b7 $\overline{n0}$ $\overline{n7}$ | | |
| c4 =b4 n4 | PE, no change | p4 =n4 |
| +b7 $\overline{n7}$ n1 $\overline{n0}$ | offset, from LHA | +n5 n3 |
| +b6 $\overline{n6}$ n2 $\overline{n1}$ | | +n6 n2 |
| +b5 $\overline{n5}$ n3 n2 | | +n7 n1 |
| +b4 $\overline{n4}$ n3 | | +$\overline{n0}$ |
| +b3 n5 $\overline{n4}$ n3 | offset, from RHA | |
| +b2 n6 $\overline{n5}$ n2 | | |
| +b1 $\overline{n7}$ $\overline{n6}$ n1 | | |
| +b0 $\overline{n7}$ $\overline{n0}$ | | |
| c5 =b5 $\overline{n5}$ | PE, no change | p5 =n5 |
| +b7 $\overline{n7}$ n2 $\overline{n1}$ | offset, from LHA | +n6 n3 |

TABLE 2-continued

| centrifuged address result | comment | centrifuged mask result |
|---|---|---|
| +b6 $\overline{n6}$ n3 $\overline{n2}$ | | +n7 n2 |
| +b5 $\overline{n5}$ $\underline{n3}$ | | +n1 |
| +b3 n6 $\overline{n5}$ n3 | offset, from RHA | |
| +b2 $\overline{n7}$ $\overline{n6}$ n2 | | |
| +b1 $\overline{n7}$ n1 | | |
| c6 =b6 $\underline{n6}$ | PE, no change | p6 =n6 |
| +b7 $\overline{n7}$ n3 $\overline{n2}$ | offset, from LHA | +n7 n3 |
| +b6 $\overline{n6}$ $\underline{n3}$ | | +n2 |
| +b3 $\overline{n7}$ n6 n3 | offset, from RHA | |
| +b2 $\overline{n7}$ n2 | | |
| c7 =b7 $\underline{n7}$ | PE, no change | p7 =n7 |
| +b7 $\overline{n7}$ $\overline{n3}$ | offset, from LHA | +n3 |
| +b3 $\overline{n7}$ n3 | offset, from RHA | |

Those skilled in the art will readily understand that the boolean equations for all of the centrifuge stages 402–412 shown in FIG. 13 can be generated in a similar manner.

Not counting fan-out creation, the number of levels of logic required is no more than 3 levels per centrifuge stage (assuming a 64-bit fan-in using 8-input NAND gates requires two levels). The initial stages will have low fan-in counts and could therefore be implemented in two levels. However, the later stages may require an additional level because of high fan-out requirements for the mask terms (generally each mask term may have to drive up to two loads per bit in that stage). Assuming 3 levels of logic per stage, a 64-bit recursive address centrifuge can thus be implemented in 18 logic levels. In a typical digital system design the propagation time through 18 levels of logic would require perhaps three clock periods whereas the 5 bit implementation of FIG. 9 would produce the same result in thirteen clock periods.

Although the above embodiment of the recursive centrifuge can be used to centrifuge an address having any number of PE or offset bits, another embodiment of a recursive centrifuge for use in applications having a restricted range of PE and offset bits may be designed to further reduce gate count. This is accomplished by eliminating terms that would propagate a PE bit or offset bit out of a position from which it could not possibly have originated. For example, assume the PE number is fixed at 16 bits. In going from a pair of 32-bit partial results to a 64-bit result, it will not be possible for RHA or LHA bits lower than position 16 (i.e., bits 0 through 15) to be PE bits. In this way, terms in the equations which require bits 0–15 to be PE bits can therefore be omitted.

Like the serial and 5-bit parallel centrifuge implementations discussed above, a recursive address centrifuge is easily pipelined. Because each partial result will generally require no more than three logic levels, pipe staging can conveniently be inserted at the end of any partial result calculation.

Further, a recursive centrifuge may be used to form partial results which can then be further processed using other methods, such as the 5-bit parallel, semi-pipelined implementation described above with respect to FIG. 9. While requiring a longer period of time to produce a result, such a "hybrid" centrifuge could be implemented with fewer gates, thus producing a more optimal implementation for a given set of circumstances.

Those skilled in the art will readily appreciate and understand that the varying implementations and combinations thereof described herein allow easy adaptation for optimal performance characteristics in any given situation or system environment.

A recursive centrifuge therefore provides several desirable features: (1) low latency implementation which produces a centrifuged result much faster than other non-brute force methods, (2) greater gate-count efficiency than brute force combinational implementations, (3) easy to pipeline to enable production of a new result each clock period, and (4) a conceptually simple processing algorithm that can be concisely expressed and systematically implemented.

Block Transfers

An application of the address centrifuge will now be explained. Referring again to FIG. 2, the present address centrifuge may be used in block transfer engine 208 to assist in performing transfers of blocks of data between local and remote memory. A block transfer engine (BLT) 208 is an asynchronous direct memory access controller which redistributes system data between local and remote memory blocks.

A BLT may use the address centrifuge to perform four types of data transfer operations: constant stride read, constant stride write, gather and scatter. A constant stride read operation transfers data from fixed increment address locations in remote memory to fixed increment addresses in local memory. A constant stride write operation transfers data from fixed increment address locations in local memory to fixed increment address locations in remote memory.

A gather operation transfers data from nonsequential memory locations in remote memory to fixed increment address locations in local memory. A scatter operation transfers data from fixed increment address locations in local memory to nonsequential memory locations in remote memory.

Figure 14:
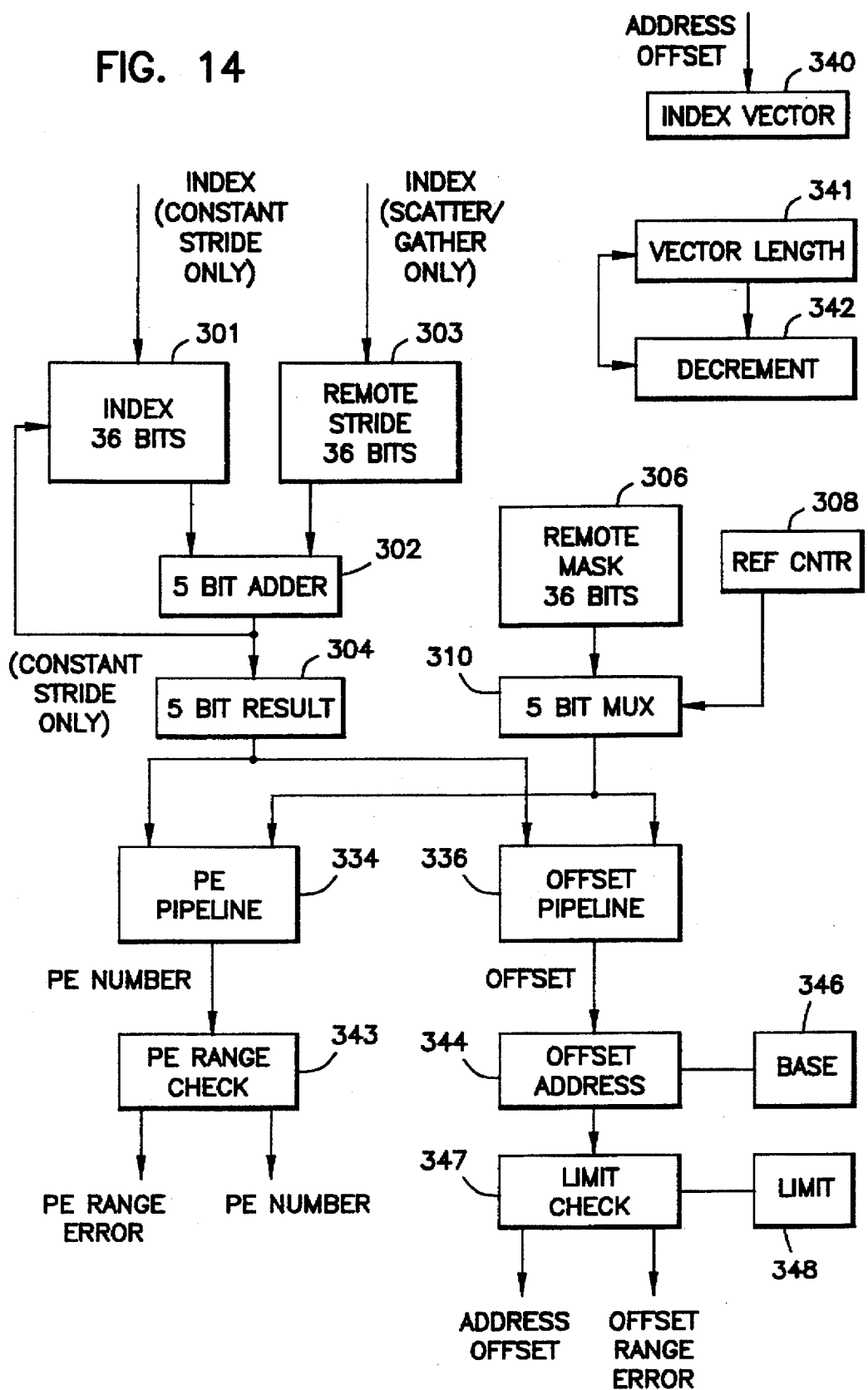
FIG. 14 shows a block diagram of the use of the address centrifuge in a block transfer engine.
Figure 5:
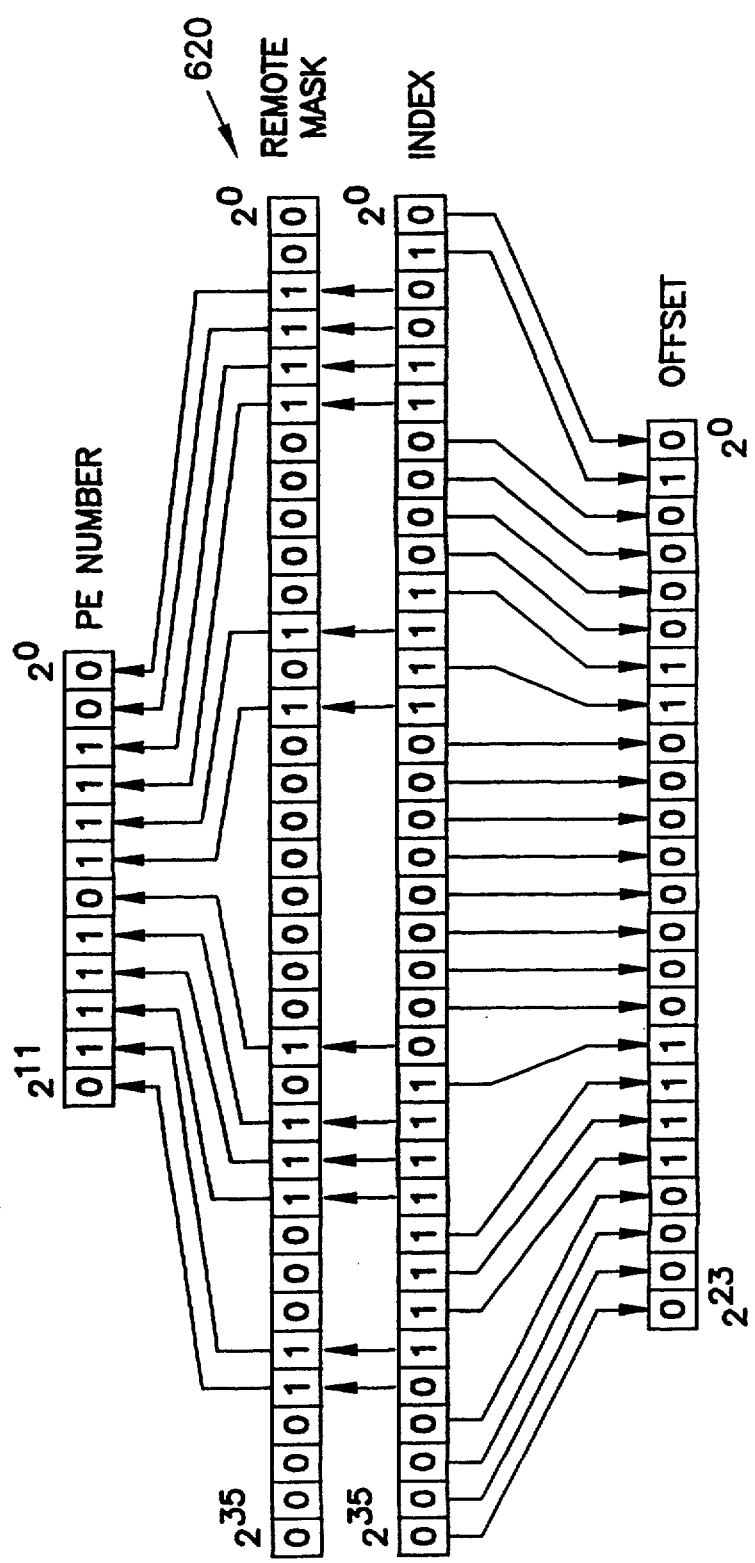
Figure 7A:
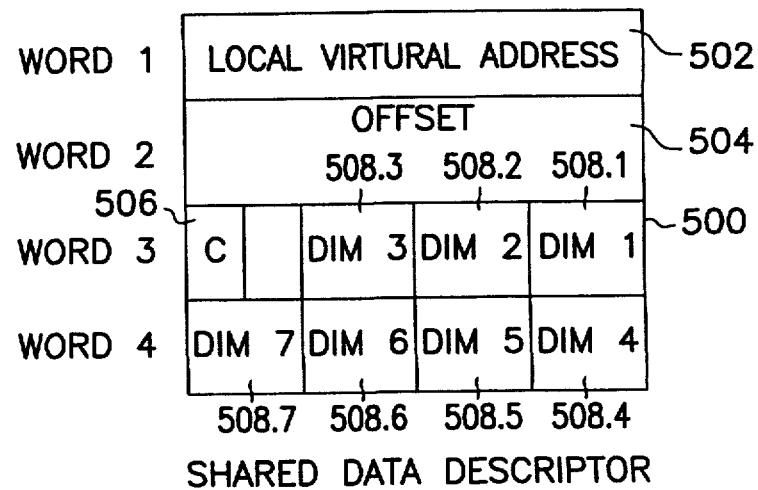
Figure 7B:
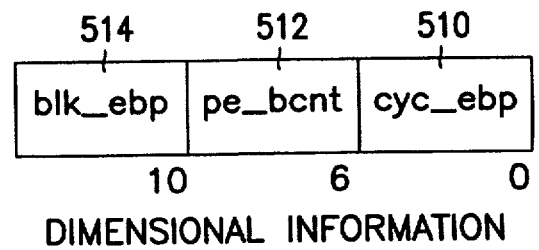

Use of the address centrifuge in a BLT is shown in FIG. 14. The BLT shown in FIG. 14 uses the address centrifuge embodiment described with respect to FIG. 9. It shall be understood however, that any of the alternate preferred centrifuge implementations could also be used without departing from the spirit and scope of the present invention. Indeed, the substitution of alternate centrifuge implementations does not alter the functionality or the flexible advantageous addressing capabilities achievable, merely the speed with which a centrifuged address can be obtained.

To perform the four data transfer operations, the BLT must generate the desired remote index address to be read from or written to. This is the index as discussed above which is a memory address that contains a PE number and offset in a software defined bit format. The index is incremented during a constant stride read or write operation and held constant during a scatter or gather operation.

Before a constant stride read or write operation, the PE loads information into the BLT, the index register the remote stride register and the vector length register. Initially, the index register 301 is loaded with the first remote index that will be converted into a remote address. The remote stride register 303 is loaded with a value that the BLT repeatedly adds to the remote index to generate successive remote indexes. The vector length register 341 is loaded with a value equal to the total number of remote memory locations that the PE wishes to address. If set to 0, the BLT generates the maximum number of addresses, which is defined as 65,536 in the preferred embodiment.

During the constant stride operation, the BLT reads the first remote index from index register 301 and sends the index to the centrifuge. When reading the first index, the remote stride register is disabled and its value is zero. As the BLT sends the first index to the centrifuge, it decrements vector length register 341.

The BLT then adds the remote stride to the first index. This value is the next index value. As the BLT sends the next index value to the centrifuge, it decrements the vector length register.

The BLT then adds the remote stride to the next index to generate yet another index. As the BLT sends this index value to the centrifuge, it decrements the vector length register. The BLT continues this process until the value of the vector length register is zero, indicating that all desired addresses have been generated.

During a scatter or gather operation, the index value is routed through remote stride register 303 and the feedback to index register 301 is disabled. Before loading the BLT registers with information, the PE loads contiguous 64-bit local memory locations with indexes corresponding to the desired non-sequential remote memory locations which are to be addressed. Each of the local memory locations contains one index value.

Before starting the scatter or gather operation, the PE loads index vector register 340 with a 24-bit address offset that points to the first index stored in local memory. During the scatter or gather operation, the BLT reads the value of index vector register 340 and retrieves the index or group of indexes from the local memory. The BLT preferably retrieves indexes in groups of four. After reading the contents of the index vector register, the BLT automatically increments the value of the index vector register by the appropriate amount (by four in the preferred embodiment) to the point to the next index value or group of indexes to be addressed.

Each index read from the local memory is added to index register 301. Because of this characteristic, the value of index register 301 can be zero or can be used as a base value for remote indexes. As the sum of the index and the value of index register 301 is sent to the centrifuge, the BLT decrements the value of vector length register 341 as described above for constant stride operations.

The BLT then retrieves the next set of indexes from local memory pointed to by the index vector register 340. After reading the contents of the index vector register, the value therein is incremented to point to the next group of remote memory locations.

Each index in the next set of indexes is also added to the value stored in index register 301. As the sum of the index and the value of the remote index register is sent to the centrifuge, the value of the vector length register is decremented. The BLT continues to read the indexes from local memory until the value of the vector length register is zero.

After the centrifuge separates the index into the PE number and offset, the BLT converts the offset into an address offset. Adder 344 adds the offset to a base address stored in base register 346. The base register contains the starting word-oriented address of a remote data structure.

Before sending the address offset to the network interface, the BLT checks its value by comparing the address offset to the value in limit register 348. If the value of the address offset is greater than the value contained in the limit register 348 an offset range error occurs.

The BLT also does a PE range check on the PE number in register 330. For example, if a reference to PE number 9 occurs in a PE which is part of an 8 PE partition (see the aforementioned patent application entitled BARRIER SYNCHRONIZATION FOR DISTRIBUTED MASSIVELY PARALLEL PROCESSING SYSTEMS" for a detailed description of PE partitioning), a PE range error will occur.

The flexible addressing scheme, centrifuge and block transfer engine can be used to achieve a wide variety of data organizations in memory. An example using a 5-bit index will now be given, in which two of the five bits are assigned to the PE number and three of the five bits are assigned to the offset. For simplicity of illustration, the example will demonstrate the generation of indexes during a constant stride read or write operation. In this operation, the remote stride is set to 1. Also, the first index is set to zero.

Table 3 shows three examples of how the bits of the index may be defined. As the index increments sequentially from 0 to 31 ($00000_2$ to $11111_2$), each of the three formats increment through PE numbers and index offsets differently.

In the first format (column I), the two most significant bits, bits $2^4$ and $2^3$, of the index are assigned as the PE number. Bits $2^0$–$2^2$ are assigned as the offset. As the index increments from 0 to 7, the offset increments from 0 to 7 in PE number 0. As the index increments from 8 to 17, the offset increments from 0 to 7 in PE number 1. In this format, the offset increments from 0 to 7 before the PE number increments.

In the second format (column II), the two least significant bits, bits $2^1$ and $2^0$, of the index are assigned as the PE number. As the index increments from 0 to 3, the PE number increments from 0 to 3 and the offset in bits $2^2$–$2^4$ is 0. As the index increments from 4 to 7, the PE number increments from 0 to 3 and the index offset is 1. In this format, the PE number increments from 0 to 3 before the offset increments.

In the third format (column III), bits $2^3$ and $2^1$ of the index are assigned as the PE number. As the index increments from 0 to 31, the PE number and offset increment in a set pattern. In this format, all of the PE number and offset combinations are incremented through, but are not incremented through sequentially.

TABLE 3

Index Format Examples

| | (I) $2^4, 2^3$ = PE Number $2^2, 2^1, 2^0$ = Offset | | (II) $2^1, 2^0$ = PE Number $2^4, 2^3, 2^2$ = Offset | | (III) $2^3, 2^1$ = PE Number $2^4, 2^2, 2^0$ = Offset | |
|---|---|---|---|---|---|---|
| Index Bits $2^4$-$2^0$ | PE Number | Offset | PE Number | Offset | PE Number | Offset |
| 00000 | 0 | 0 | 0 | 0 | 0 | 0 |
| 00001 | 0 | 1 | 1 | 0 | 0 | 1 |
| 00010 | 0 | 2 | 2 | 0 | 1 | 0 |
| 00011 | 0 | 3 | 3 | 0 | 1 | 1 |
| 00100 | 0 | 4 | 0 | 1 | 0 | 2 |
| 00101 | 0 | 5 | 1 | 1 | 0 | 3 |
| 00110 | 0 | 6 | 2 | 1 | 1 | 2 |
| 00111 | 0 | 7 | 3 | 1 | 1 | 3 |
| 01000 | 1 | 0 | 0 | 2 | 2 | 0 |
| 01001 | 1 | 1 | 1 | 2 | 2 | 1 |
| 01010 | 1 | 2 | 2 | 2 | 3 | 0 |
| 01011 | 1 | 3 | 3 | 2 | 3 | 1 |
| 01100 | 1 | 4 | 0 | 3 | 2 | 2 |
| 01101 | 1 | 5 | 1 | 3 | 2 | 3 |
| 01110 | 1 | 6 | 2 | 3 | 3 | 2 |
| 01111 | 1 | 7 | 3 | 3 | 3 | 3 |
| 10000 | 2 | 0 | 0 | 4 | 0 | 4 |
| 10001 | 2 | 1 | 1 | 4 | 0 | 5 |
| 10010 | 2 | 2 | 2 | 4 | 1 | 4 |
| 10011 | 2 | 3 | 3 | 4 | 1 | 5 |
| 10100 | 2 | 4 | 0 | 5 | 0 | 6 |
| 10101 | 2 | 5 | 1 | 5 | 0 | 7 |
| 10110 | 2 | 6 | 2 | 5 | 1 | 6 |
| 10111 | 2 | 7 | 3 | 5 | 1 | 7 |
| 11000 | 3 | 0 | 0 | 6 | 2 | 4 |
| 11001 | 3 | 1 | 1 | 6 | 2 | 5 |
| 11010 | 3 | 2 | 2 | 6 | 3 | 4 |
| 11011 | 3 | 3 | 3 | 6 | 3 | 5 |
| 11100 | 3 | 4 | 0 | 7 | 2 | 6 |

TABLE 3-continued

Index Format Examples

| | (I) $2^4, 2^3$ = PE Number $2^2, 2^1, 2^0$ = Offset | | (II) $2^1, 2^0$ = PE Number $2^4, 2^3, 2^2$ = Offset | | (III) $2^3, 2^1$ = PE Number $2^4, 2^2, 2^0$ = Offset | |
|---|---|---|---|---|---|---|
| Index | | | | | | |
| Bits $2^4$-$2^0$ | PE Number | Offset | PE Number | Offset | PE Number | Offset |
| 11101 | 3 | 5 | 1 | 7 | 2 | 7 |
| 11110 | 3 | 6 | 2 | 7 | 3 | 6 |
| 11111 | 3 | 7 | 3 | 7 | 3 | 7 |

The examples shown in Table 3 illustrate how the flexible addressing scheme, software mask and address centrifuge can be used to acbe used to achieve a wide variety of data arrangements or organizations throughout memory. Although Table 3 and the examples therein are for constant strides it shall be understood by those of skill in the art that scatter or gather operations can also be performed using the same techniques.

It shall also be understood by those of skill in the art that there are many ways in which the present bit extraction techniques may be used in a system. For example, in addition to its use in a block transfer engine such as that described above, an address centrifuge can be used to operate directly on processor generated addresses. The flexible addressing scheme which the address centrifuge supports can be used in many different ways in a distributed memory multiprocessing system. Furthermore, such techniques could be used advantageously to extract predefined bits from data in signal processing or encryption applications. Therefore the present invention could be applied to any data field to produce a regular or arbitrary mapping of input and output data, and is not limited to addressing applications.

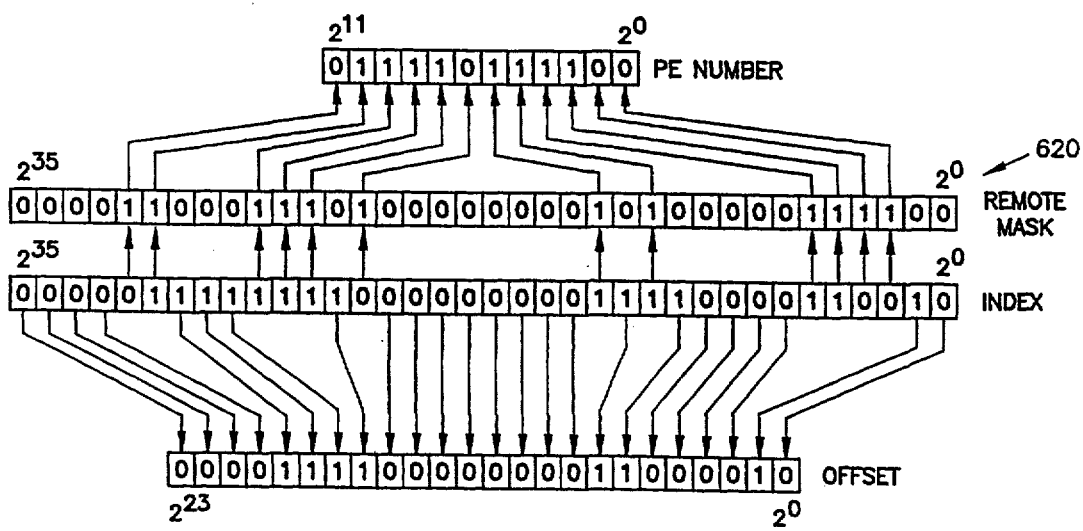

What is claimed is:

1. In a computing system having a plurality of processing elements, wherein each processing element includes a local memory having a plurality of local memory locations, including a first local memory location, a method of addressing a first array element of a plurality of array elements, wherein the tint array element is stored in the first memory location of a particular processing element, wherein each array element is associated with a linearized index, and wherein each linearized index comprises P processing element number bits and L local memory offset bits, the method comprising the steps of:

generating a mask word, wherein the mask word has P+L mask word bits; and recursively centrifuging the mask word and linearized index to obtain a processing element number associated with the particular processing element and a local memory address associated with the first memory location, by the steps including:

a) repetitively dividing the mask bits into a plurality of subwords:

b) centrifuging each subword of the plurality of subwords to create centrifuged subwords and performing identical translations to associated bits of the linearized index:

c) grouping the centrifuged subwords into groups of subwords:

d) centrifuging the groups of subwords, performing identical translations to associate bits of the particular linearized index; and e) repeating steps c) and d) until the mask word is completely centrifuged, whereby the transposed bits of the linearized index form a concatenated word of P processing element number bits and L local memory offset bits.

2. The method of claim 1, wherein the step of repetitively dividing comprises the step of dividing until each subword of the plurality of subwords is less than three bits long.

3. The method according to claim 1 wherein the step of recursively centrifuging comprises the steps of:

a) mapping each bit of the linearized index to an associated mask bit;

b) storing the mask word in a mask register; and c) storing the linearized index in a linearized index register.

4. The method according to claim 1 wherein each mask word bit associates a processing element number bit with a first Boolean state value and a local memory offset bit with a second Boolean slate value, wherein the step of generating a mask word comprises constructing the mask word from a distribution specification and wherein the step of centrifuging each subword comprises the steps of:

a) searching for a transition between processing element bits and offset bits in pairs of adjacent bits of the subword; and b) if a transition is detected between a pair of adjacent bits, transposing the pair of adjacent bits to form a mask result for each pair and transposing bits in equivalent bit positions in the linearized index to form an index result for each pair.

5. The method of claim 1, wherein the step of recursively centrifuging is performed using sum-of-products expressions for each mask bit and each address bit.

6. The method of claim 5, wherein the sum-of-products expressions are implemented in hardware to generate the processing element number and the local memory address.

* * * * *

UNITED STATES PATENT AND TRADEMARK OFFICE
CERTIFICATE OF CORRECTION

PATENT NO. : 5,696,922              Page 1 of 4

DATED      : December 9, 1997

INVENTOR(S) : Eric C. Fromm

It is certified that error appears in the above-identified patent and that said Letters Patent is hereby corrected as shown below:

The title page, should be deleted to be replaced with the attached title page.
On title page, Other Publications, please insert --COMPCON SPRING '93, February 22, 1993, San Francisco, CA, Bradley R. Carlile, "Algorithms and Design: The CRAY APP Shared-Memory System," pages 312-320--.

The drawing sheets consisting of Figs. 5, 7A and 7B, should be deleted to be replaced with drawing Figs. 5, 7A and 7B, as shown on the attached pages.

At Col. 5, line 19, please delete "(2)" and insert --(1)--.

At Col. 15, line 25, delete "Degenerated" and insert --Degenerate--.

At Col. 15, line 32, please delete "4" and insert --d--.

At Col. 23, line 44, please delete "tint" and insert --first--.

Signed and Sealed this

Third Day of November, 1998

Attest:

BRUCE LEHMAN

*Attesting Officer*          *Commissioner of Patents and Trademarks*

United States Patent [19]

Fromm

[11] Patent Number: 5,696,922

[45] Date of Patent: Dec. 9, 1997

[54] RECURSIVE ADDRESS CENTRIFUGE FOR DISTRIBUTED MEMORY MASSIVELY PARALLEL PROCESSING SYSTEMS

[75] Inventor: Eric C. Fromm, Eau Claire, Wis.

[73] Assignee: Cray Research, Inc., Eagan, Minn.

[21] Appl. No.: 165,388

[22] Filed: Dec. 10, 1993

[51] Int. Cl.[6] .................................................. G06F 12/00
[52] U.S. Cl. ............................... 395/405; 395/421.1
[58] Field of Search ............................... 395/200, 400, 395/425, 427, 405, 421.1, 401; 282/283

[56] References Cited

FOREIGN PATENT DOCUMENTS

| 0570729 | 11/1993 | European Pat. Off. |
| WO91/10194 | 7/1991 | WIPO |
| WO91/10200 | 7/1991 | WIPO |

OTHER PUBLICATIONS

Tom MacDonald, et al. "Addressing in Cray Research's MPP Fortran," *Proceedings, Third Workshop on Compilers for Parallel Computers*, ACPC/TR, Jul., 1992.

Erik P. DeBenedictis, et al. "Extending Unix for Scalable Computing," *Computer*, vol. 26, No. 11, pp. 43–53, Nov., 1993.

David Loveman, "Element Array Assignment —the FORALL Statement," *Proceedings, Third Workshop on Compilers for Parallel Computers*, ACPC/TR, Jul., 1992.

Min–You Wu, et al., "DO and FORALL: Temporal and Spacial Control Structures," *Proceedings, Third Workshop on Compilers for Parallel Computers*, ACPC/TR, Jul., 1992.

Philip J. Hatcher, et al., "Compiling Data–Parallel Programs for MIMD Architectures," *Proceedings, Third Workshop on Compilers for Parallel Computers*, ACPC/TR, Jul., 1992.

Barbara Chapman, et al., "Programming in Vienna Fortran," *Proceedings, Third Workshop on Compilers for Parallel Computers*, ACPC/TR, Jul., 1992.

*Primary Examiner*—Jack A. Lane
*Attorney, Agent, or Firm*—Schwegman, Lundberg, Woessner & Kluth, P.A.

[57] ABSTRACT

A method for extracting a PE number and offset from an array index by recursive centrifuging. According to one aspect of the present invention, a processing element number is assigned to each processing element, a local memory address is assigned to each memory location and a linearized index is assigned to each array element in a multidimensional array. The processing element number of the processing element in which a particular array element is stored is computed as a function of a linearized index associated with the array element and a mask word determined from the distribution specification associated with the array. The mask word is generated from the distribution specification and applied to a linearized index associated with a particular array element to obtain processing element number bits and local offset bits. The processing element number bits and local offset bits are then accumulated to create the processing element number and local offset for the memory location associated with the array element.

6 Claims, 20 Drawing Sheets